United States Patent
Sykora et al.

(10) Patent No.: US 10,240,839 B2
(45) Date of Patent: Mar. 26, 2019

(54) APPARATUSES, SYSTEMS, AND METHODS OF VARIABLE FREQUENCY DRIVE OPERATION AND CONTROL

(71) Applicant: TRANE INTERNATIONAL INC., Piscataway, NJ (US)

(72) Inventors: Benjamin James Sykora, Holmen, WI (US); Nathan Thomas West, Holmen, WI (US); Pavak Mehta, LaCrescent, MN (US)

(73) Assignee: Trane International LLC., Piscataway, NJ (US)

(*) Notice: Subject to any disclaimer, the term of this patent is extended or adjusted under 35 U.S.C. 154(b) by 552 days.

(21) Appl. No.: 14/849,866

(22) Filed: Sep. 10, 2015

(65) Prior Publication Data

US 2015/0377537 A1    Dec. 31, 2015

Related U.S. Application Data

(63) Continuation of application No. PCT/US2014/025603, filed on Mar. 13, 2014.
(Continued)

(51) Int. Cl.
  *F25B 49/02* (2006.01)
  *F25B 13/00* (2006.01)
  *F25B 31/00* (2006.01)

(52) U.S. Cl.
  CPC ............ *F25B 49/022* (2013.01); *F25B 13/00* (2013.01); *F25B 31/006* (2013.01);
  (Continued)

(58) Field of Classification Search
  CPC ....... F25B 49/02; F25B 49/022; F25B 49/025
  See application file for complete search history.

(56) References Cited

U.S. PATENT DOCUMENTS

| | | |
|---|---|---|
| 3,270,521 A | 9/1966 | Rayner et al. |
| 3,548,612 A | 12/1970 | Mitsubayashi et al. |

(Continued)

FOREIGN PATENT DOCUMENTS

| | | |
|---|---|---|
| CN | 1469091 | 1/2004 |
| CN | 1185203 | 1/2005 |

(Continued)

OTHER PUBLICATIONS

Danfoss, "Whitepaper Audible Noise Reduction", also available at danfossdrives.com, Jan. 2011, 4 pgs.
(Continued)

*Primary Examiner* — Ljiljana V. Ciric
*Assistant Examiner* — Alexis K Cox
(74) *Attorney, Agent, or Firm* — Taft Stettinius & Hollister LLP

(57) ABSTRACT

An exemplary system includes a compressor, a condenser, an expander, and an evaporator fluidly coupled to form a vapor-compression circuit, and an electric motor configured to drive the compressor. An inverter having a plurality of switching elements is configured to provide an output voltage to the electric motor through operation of the switching elements. A waste heat recovery circuit is configured to transfer waste heat from the inverter to a load. A controller is configured provide switching commands to the switching elements of the inverter. The controller is further configured to sense a condition of the system, determine a heat production requirement based at least in part upon the system condition, and to vary the number of switching commands per unit time based at least in part upon the heat production requirement.

15 Claims, 11 Drawing Sheets

Related U.S. Application Data

(60) Provisional application No. 61/787,073, filed on Mar. 15, 2013, provisional application No. 61/787,158, filed on Mar. 15, 2013.

(52) U.S. Cl.
CPC ........ *F25B 49/025* (2013.01); *F25B 2400/05* (2013.01); *F25B 2600/021* (2013.01); *Y02B 30/741* (2013.01)

(56) References Cited

U.S. PATENT DOCUMENTS

| | | | |
|---|---|---|---|
| 3,563,051 | A | 2/1971 | Baumgartner |
| 3,820,350 | A | 6/1974 | Brandin et al. |
| 4,178,765 | A | 12/1979 | Slayton |
| 4,210,001 | A | 7/1980 | Miller |
| 4,254,637 | A | 3/1981 | Brauch et al. |
| 4,429,544 | A | 2/1984 | McCarty |
| 4,720,981 | A | 1/1988 | Helt et al. |
| 5,088,297 | A | 2/1992 | Maruyama et al. |
| 5,123,080 | A * | 6/1992 | Gillett .................. F25B 49/025 318/806 |
| 5,429,179 | A | 7/1995 | Klausing |
| 5,502,984 | A | 4/1996 | Boehde et al. |
| 5,590,539 | A | 1/1997 | Marohl et al. |
| 5,610,453 | A | 3/1997 | Smith |
| 5,645,124 | A | 7/1997 | Hartfield et al. |
| 5,884,498 | A | 3/1999 | Kishimoto et al. |
| 5,894,740 | A | 4/1999 | Renz |
| 5,899,091 | A | 5/1999 | Fraser, Jr. et al. |
| 5,986,426 | A | 11/1999 | Rowan |
| 6,043,996 | A | 3/2000 | Kumar |
| 6,058,727 | A | 5/2000 | Fraser, Jr. et al. |
| 6,067,804 | A | 5/2000 | Moeykens et al. |
| 6,116,040 | A | 9/2000 | Stark |
| 6,170,286 | B1 | 1/2001 | Keuper |
| 6,182,467 | B1 | 2/2001 | Zhong et al. |
| 6,281,372 | B1 | 8/2001 | Wiese et al. |
| 6,467,300 | B1 | 10/2002 | Noble, III |
| 6,672,102 | B1 | 1/2004 | Huenninger et al. |
| 7,003,971 | B2 | 2/2006 | Kester et al. |
| 7,271,993 | B2 | 9/2007 | Plojhar et al. |
| 7,983,061 | B2 | 7/2011 | Yang |
| 8,049,481 | B2 | 11/2011 | Li et al. |
| 8,287,230 | B2 | 10/2012 | Hurst, Jr. et al. |
| 9,032,753 | B2 | 5/2015 | Love et al. |
| 9,032,754 | B2 | 5/2015 | Love et al. |
| 9,581,130 | B2 | 2/2017 | Zakheos |
| 2002/0192089 | A1 * | 12/2002 | Hill ....................... F04D 17/122 417/423.7 |
| 2004/0237550 | A1 * | 12/2004 | Yamasaki ............... F25B 9/008 62/228.1 |
| 2005/0055141 | A1 * | 3/2005 | Suzuki ..................... B60L 3/06 701/22 |
| 2007/0227472 | A1 | 10/2007 | Takeucki et al. |
| 2009/0102405 | A1 * | 4/2009 | Hwang ................... F24F 11/70 318/400.15 |
| 2009/0126376 | A1 | 5/2009 | Knoll |
| 2010/0102642 | A1 | 4/2010 | Odaohhara et al. |
| 2010/0186410 | A1 | 7/2010 | Cogswell et al. |
| 2011/0172859 | A1 | 7/2011 | Sankaran et al. |
| 2012/0001575 | A1 | 1/2012 | Kubo |
| 2012/0222438 | A1 * | 9/2012 | Osaka ................ B60H 1/00271 62/126 |
| 2012/0222441 | A1 | 9/2012 | Sawada et al. |
| 2013/0305760 | A1 | 11/2013 | Shinomoto et al. |
| 2015/0040560 | A1 | 2/2015 | Jozsa et al. |

FOREIGN PATENT DOCUMENTS

| | | |
|---|---|---|
| CN | 1673647 | 9/2005 |
| CN | 1692262 | 11/2005 |
| CN | 102312829 | 1/2012 |
| CN | 102472529 | 5/2012 |
| CN | 102472532 | 5/2012 |
| EP | 2460927 A1 | 6/2012 |
| EP | 2469201 A2 | 6/2012 |
| JP | 2004085178 A1 | 3/2004 |
| JP | 2007327668 | 12/2007 |
| JP | 2009264206 | 11/2009 |
| JP | 2009264699 | 11/2009 |
| JP | 2012007825 | 1/2012 |
| KR | 19980033183 | 7/1998 |
| KR | 10-2000-0018135 | 4/2000 |
| WO | 2009056527 | 10/2008 |
| WO | 2012107987 A1 | 8/2012 |

OTHER PUBLICATIONS

Gaede, Kyle, "Suppressing Acoustic Noise in PWM Fan Speed Control Systems", 2003 Microchip Technology, Inc., 3 pgs.

Lo, W.C., et al., "Acoustic Noise Radiated by PWM-Controlled Induction Machine Drives", IEEE Transactions on Industrial Electonics, vol. 47, No. 4, Aug. 2000, 10 pgs.

Capitaneanu, Stefan Laurentiu, et al., "On the Acoustic Noise Radiated by PWM AC Motor Drives", Automatika, 2003, 9 pgs.

International Search Report and Written Opinion, International Patent Application No. PCT/US2014/025603, dated Aug. 21, 2014, 12 pgs.

* cited by examiner

APPARATUSES, SYSTEMS, AND METHODS OF VARIABLE FREQUENCY DRIVE OPERATION AND CONTROL

BACKGROUND

The present application relates generally to apparatuses, systems, and methods of variable frequency drive operation and control. Variable frequency motor drives offer a number of potential benefits for applications such as driving compressors or other loads for heating, ventilation, air-conditioning, or refrigeration (HVACR) systems, including potential for enhanced efficiency, power density, and speed control precision. Such motor drives present unique challenges with respect to waste heat and control of the same. Conventional designs often seek to minimize waste losses under all operating conditions to the extent possible in light of other operational targets. Some proposals have been made for recapture of part of the waste heat generated by variable frequency drive operation. These approaches suffer from a number of disadvantages and shortcomings including those respecting control and beneficial use of waste heat. Such motor drives also present unique challenges with respect to audible noise and control of the same. Conventional designs often seek to minimize audible noise under all operating conditions, for example by setting the switching frequency as high as the motor load will allow. These approaches suffer from a number of disadvantages and shortcomings including those respecting system efficiency and generation of waste heat. There remains a significant need for the unique and inventive apparatuses, methods and systems disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

A number of non-limiting exemplary embodiments are summarized below. Further embodiments, forms, objects, features, advantages, aspects, and benefits shall become apparent from the following description and drawings.

One exemplary embodiment is a system comprising: a compressor, an expander, a first heat exchanger, and a second heat exchanger, fluidly coupled to form a vapor-compression circuit; an electric motor configured to drive the compressor; an inverter comprising a plurality of switching elements, the inverter configured to provide an output voltage to the electric motor through operation of the switching elements; a waste heat recovery circuit configured to transfer waste heat from the inverter to a selected component of the system; and a controller including a system conditions module structured to sense a condition of the system, a heat production module structured to determine a heat production requirement based at least in part upon the system condition, and an inverter operation module structured to provide switching commands to the switching elements of the inverter, wherein the controller is configured to vary the number of switching commands per unit time based at least in part upon the heat production requirement.

In some forms the controller is configured to vary the number of switching commands per unit time by changing the switching frequency of a PWM signal. In some forms the controller is configured to vary the number of switching commands per unit time by changing between a continuous PWM signal and a discontinuous PWM signal. In some forms the condition comprises a system start-up condition. In some forms a working fluid of the vapor-compression circuit comprises a refrigerant and an oil; and wherein the waste heat recovery circuit is structured to transfer heat from the inverter to the working fluid such that the refrigerant boils and is separated from the oil. In some forms the waste heat recovery circuit is configured to exchange heat with a compressor-lubricating oil. In some forms the the selected component is a suction line of the compressor, and wherein the condition comprises a temperature of a refrigerant in the suction line. Some forms further comprise a reversing mechanism operable to reverse the flow direction of a refrigerant in the vapor-compression circuit. In some forms the selected component is at least one of the first and second heat exchangers, and wherein the condition comprises a reversal of flow direction. Some forms further comprise a temperature sensor configured to sense an inverter temperature; and wherein the inverter operation module is further structured to reduce the number of switching commands per unit time in response to the inverter temperature being greater than a reference temperature.

One exemplary embodiment is a system comprising: a refrigerant loop including a compressor, a condenser, an expander, and an evaporator; a motor configured to drive the compressor; a variable frequency drive including an inverter configured to drive the motor; a cooling circuit configured to receive heat generated by operation of the inverter; a controller configured to provide switching commands to the inverter; wherein the controller is configured to vary the rate of switching commands to selectively increase the heat generated by the inverter based upon one or more first criteria for increased heat transfer to the cooling circuit, and selectively decrease the heat generated by the inverter based upon one or more second criteria.

In some forms the controller is configured to vary the rate of switching commands by not providing a switching command for a predetermined duration or a predetermined time. In some forms the cooling circuit is further configured to transfer heat to the refrigerant loop between a refrigerant inlet of the evaporator and the compressor, and wherein the first criteria comprises a temperature of a working fluid between the refrigerant inlet of the evaporator and the compressor being below a predetermined superheat temperature. In some forms the cooling circuit is further configured to transfer heat to the evaporator, and wherein the first criteria comprises a detection of frost on the evaporator. Some forms further comprise an oil line configured to supply oil from to the compressor, and wherein the cooling circuit is further configured to transfer heat to the oil line.

One exemplary embodiment is a method comprising: providing a pulse width modulation (PWM) pattern to an inverter, the PWM pattern transitioning between a first signal magnitude and a second signal magnitude greater than the first signal magnitude; operating the inverter based upon the PWM pattern to provide a voltage output to drive a motor, wherein heat is generated as a byproduct of operating the inverter, and wherein the amount of heat generated correlates to the number of transitions between the first signal magnitude and the second signal magnitude; driving a compressor of a refrigeration system with the motor, the refrigeration system comprising a compressor, a condenser, and an evaporator; transferring heat between the inverter and a component of the refrigeration system using a heat transfer circuit thermally coupled to the inverter and the component; determining if additional heat is desired at the component; and modifying the PWM pattern in response to the determining such that the PWM pattern transitions between the first signal magnitude and the second signal magnitude more frequently.

Some forms further comprise determining if heat is no longer desired at the component, and ceasing the transferring heat based upon the determining. In some forms the component comprises the evaporator, the transferring heat between the inverter and the evaporator heats a working fluid within the evaporator, the working fluid comprising a refrigerant and a lubricant. Some forms further comprise separating the lubricant from the refrigerant by boiling the refrigerant with the transferred heat and returning the lubricant to the compressor. Some forms further comprise determining if less heat generation is desired and modifying the PWM pattern in response to the determining such that the PWM pattern transitions between the first signal magnitude and the second signal magnitude less frequently. In some forms the modifying the PWM pattern comprises providing only one of the first and second signal magnitudes at a predetermined time corresponding to one of a peak and a trough of a current waveform in the motor for a predetermined duration of at least ten percent of a period of the current waveform. In some forms the current waveform comprises a synthesized sinusoid. In some forms the determining if less heat generation is desirable comprises determining if a temperature of the inverter is higher than a threshold temperature.

One exemplary embodiment is a system comprising a compressor, a condenser, an expander, and an evaporator fluidly coupled to form a vapor-compression circuit; a controller comprising: an audible noise module configured to determine a target audible noise profile comprising a target maximum level of audible noise generated by the system; a schedule selection module configured to select a switching schedule based at least in part upon the target audible noise production profile; an inverter operation module configured to provide an inverter command comprising a plurality of switching commands according to the selected switching schedule; an inverter comprising a plurality of switching elements responsive to the switching commands, the inverter being configured to output a voltage signal in response to the inverter command; and a motor drivingly coupled to the compressor, and responsive to the voltage signal.

In some forms the target audible noise profile includes a profile of acceptable magnitudes of a plurality of frequencies. In some forms the audible noise module is configured to determine the target audible noise profile based at least in part upon one or more of a user selection and a time of day. In some forms the controller further comprises a pulse width modulation (PWM) schedules module configured to provide a set of PWM patterns, and wherein the schedule selection module is configured to select the switching schedule from the set of PWM patterns. In some forms the controller further comprising a conditions module configured to determine one or more conditions selected from the group consisting of a temperature of the inverter, an electrical noise level of an electrical current in the motor, and current ripple; and wherein the schedule selection module is further configured to select the switching schedule based upon the one or more conditions. In some forms the schedule selection module is further configured to determine a subset of PWM patterns that do not violate the audible noise profile, and to select the switching schedule from the subset. In some forms the schedule selection module is further configured to determine a subset of PWM patterns that do not violate a predetermined parameter of the sensed condition, and to select the switching schedule from the subset. In some forms the system further comprises a sensor configured to sense the condition, and to transmit information relating to the condition to the conditions module. In some forms the motor is a surface mounted permanent magnet machine.

One exemplary embodiment is a system comprising: a refrigerant loop including a compressor, a condenser, and an evaporator; a motor configured to drive the compressor; a variable frequency drive including an inverter configured to drive the motor; and a controller configured to provide switching commands to the inverter according to a pulse width modulation (PWM) schedule based at least in part upon a carrier frequency and a PWM technique; wherein the controller is configured to determine a target audible noise level based upon one or more criteria, and to vary at least one of the carrier frequency and the PWM technique based at least in part upon the target audible noise level.

In some forms the controller is further configured to vary at least one of the carrier frequency and the PWM technique based upon at least one of electrical noise production and current ripple. In some forms the motor is a surface mounted permanent magnet motor. In some forms the controller is further configured to vary the switching commands such that the inverter does not overheat. Some forms further comprise a user interface operable to change the target audible noise level. In some forms the controller is further configured to vary the switching commands such that a selected component is not excited at its natural frequency for longer than a first predetermined duration.

One exemplary embodiment is a method comprising: determining a target audible noise profile based on or more criteria, the target audible noise profile comprising a target audible noise level for an HVACR system including an inverter; selecting a first pulse width modulation (PWM) schedule based at least in part upon the audible noise profile; providing a first series of switching commands according to the first PWM schedule to a variable frequency drive comprising an inverter, generating an inverter waveform in response to the first series of switching commands; powering a motor with the inverter waveform such that the motor drives a compressor of a vapor-compression circuit.

In some forms the determining is based upon at least one of a user selection and a time of day. In some forms the selecting includes comparing the audible noise profile to an acoustic noise generated by the HVACR system when operated according to each of a plurality of PWM schedules. Some forms further comprise: determining a natural frequency of a component of one of the variable frequency drive, the motor, and the compressor; selecting a second PWM schedule based at least in part upon the natural frequency of the component; the providing the first series of switching commands is for a first predetermined time; the method further comprising providing a second series of switching commands according to the second PWM schedule for a second predetermined time. In some forms the audible noise profile is a first selection criterion, and the selecting is further based upon a second selection criterion, each of the selection criteria being assigned a weighting value. In some forms the second selection criterion is selected from the group consisting of inverter temperature, electrical noise generation, and system efficiency. In some forms at least one of the plurality of selection criteria is a critical selection criterion, and wherein the first PWM pattern is selected such that the critical selection criterion is satisfied. In some forms the second selection criterion is a maximum operating temperature of the inverter, and wherein the maximum operating temperature is a critical selection criterion.

DETAILED DESCRIPTION OF ILLUSTRATIVE EMBODIMENTS

Figure 1:
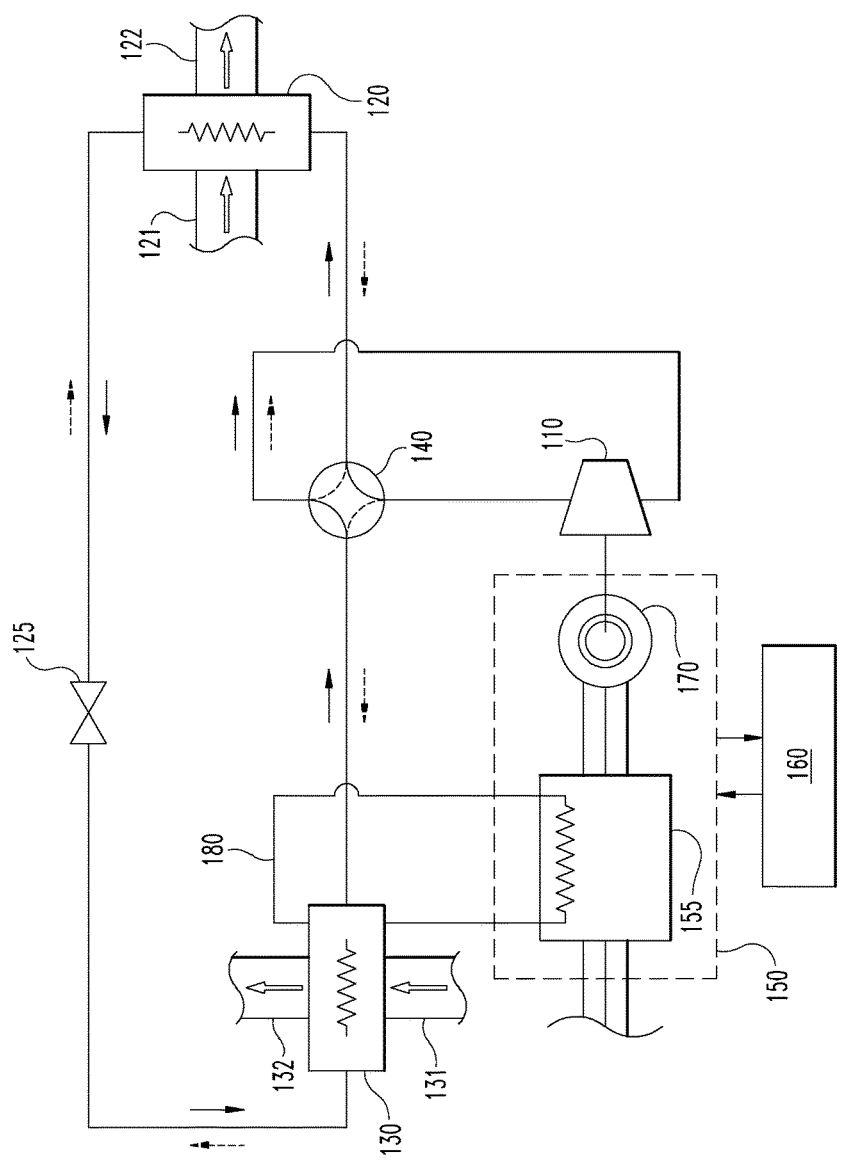
FIG. 1 is a schematic illustration of an exemplary HVACR system having a waste heat recovery circuit.

With reference to FIG. 1 there is illustrated an exemplary HVACR system 100 which includes a refrigerant loop comprising a compressor 110, a first heat exchanger 120, an expander 125, and a second heat exchanger 130. HVACR system 100 may further comprise a reversing mechanism configured to reverse the flow direction of the working fluid. In the present embodiment, the reversing mechanism is illustrated as four-way valve 140. It is also contemplated that other reversing mechanisms may be utilized, such as separate two-way valves. Furthermore, in certain exemplary embodiments such as large chiller units, it is contemplated that the compressor 110 may be directly in flow series with second heat exchanger 130 and first heat exchanger 120, and the valving which permits the system to operate in reverse, i.e., as a heat pump and a cooler, may be omitted. In such embodiments first heat exchanger 120 may be configured as a dedicated condenser and second heat exchanger 130 may be configured as a dedicated evaporator.

Four-way valve 140 is configured to receive compressed refrigerant from compressor 110 and direct the compressed refrigerant to either first heat exchanger 120 or second heat exchanger 130. Four-way valve 140 has a first configuration in which refrigerant lines are connected as shown by the solid lines and refrigerant flows in the direction of the solid arrows, and a second configuration in which refrigerant lines are connected as shown by the dashed lines and refrigerant flows in the direction of the dashed arrows. First heat exchanger 120 is a condenser when the flow is in the direction of the solid arrows, and an evaporator when the flow is in the direction of the dashed arrows. Second heat exchanger 130 is an evaporator when flow is in the direction of the solid arrows, and a condenser when flow is in the direction of the dashed arrows. The following description will be made with reference to HVACR system 100 when four-way valve 140 is in the first configuration, corresponding to solid lines and arrows. One having skill in the art will readily understand that HVACR system 100 operates in a similar fashion when four-way valve 140 is in the second configuration.

In the first configuration of four-way valve 140, refrigerant flows through system 100 in a closed loop from compressor 110 to first heat exchanger 120 to expander 125 to second heat exchanger 130 and back to compressor 110. A waste heat recovery circuit 180 transfers heat generated by variable frequency drive 155 to second heat exchanger 130. Variable frequency drive 155 may be a variable frequency motor drive 200 (FIG. 2) having an inverter module 280, described below. Various embodiments of system 100 may also include additional refrigerant loop elements including, for example, valves for controlling refrigerant flow, refrigerant filters, economizers, oil separators and/or cooling components and flow paths for various system components.

Compressor 110 is driven by a drive unit 150 including a permanent magnet electric motor 170 which is driven by a variable frequency drive 155. In the illustrated embodiment, variable frequency drive 155 is configured to output a three-phase PWM drive signal, and motor 170 is a surface magnet permanent magnet motor. Use of other types and configurations of variable frequency drives and electric motors such as interior magnet permanent magnet motors, reluctance motors, or inductance motors are also contemplated. It shall be appreciated that the principles and techniques disclosed herein may be applied to a broad variety of drive and permanent magnet motor configurations.

First heat exchanger 120 is configured to transfer heat from compressed refrigerant received from compressor 110. In the illustrated embodiment first heat exchanger 120 is a water cooled condenser which receives cooling water at an inlet 121, transfers heat from the refrigerant to the cooling water, and outputs cooling water at an outlet 122. It is also contemplated that other types of condensers may be utilized, for example, air cooled condensers or evaporative condensers. It shall further be appreciated that references herein to water include water solutions comprising additional constituents unless otherwise limited.

Expander 125 is configured to receive refrigerant from first heat exchanger 120, and to expand the received refrigerant to decrease its temperature. In the illustrated embodiment, expander 125 is a throttle valve. It is also contemplated that other types of expanders may be utilized, for example, capillary tubes. It is further contemplated that expander 125 may be formed integrally with second heat exchanger 130.

Second heat exchanger 130 is configured to receive refrigerant from expander 125, and transfer heat from a medium to the refrigerant. In the illustrated embodiment second heat exchanger 130 is configured as a water chiller which receives water provided to an inlet 131, transfers heat from the water to the refrigerant, and outputs chilled water at an outlet 132. It is contemplated that a number of particular types of evaporators may be utilized, including dry expansion evaporators, flooded type evaporators, bare tube evaporators, plate surface evaporators, and finned evaporators among others.

HVACR system 100 further includes a controller 160 which outputs control signals to variable frequency drive 155 to control operation of the motor 170 and compressor 110. Controller 160 also receives information about the operation of drive unit 150. In exemplary embodiments, controller 160 receives information relating to the temperature of various components of HVACR system 100. In further embodiments, controller 160 receives information relating to motor current, motor terminal voltage, and/or other operational characteristics of the motor.

Figure 8:
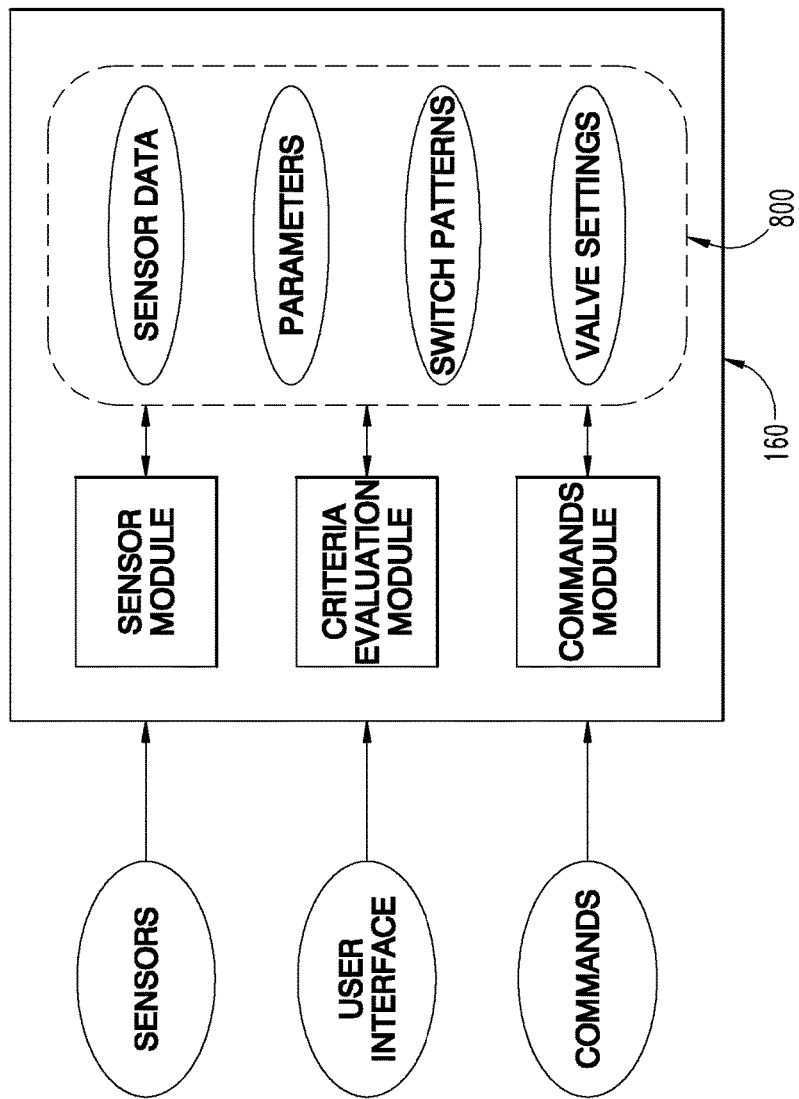
FIG. 8 is an illustrative schematic of a controller usable with the system of FIG. 1.

With reference now to FIG. 8, further details of an illustrative embodiment of controller 160 will be described. Exemplary controller 160 includes a sensor module, a criteria evaluation module, a commands module, and a data storage module 800. Controller receives 160 information from at least one sensor, for example temperature sensors provided to various components of HVACR system 100, and may further receive information from a user interface. Controller 160 provides commands to at least variable frequency drive 155, and may further provide commands to other components of HVACR system 100. Controller 160 may also output information to a user interface.

Data storage module 800 is a non-transitory computer readable medium configured to store data for use by other modules of controller 160. Data storage module 800 may store, for example, sensor data such as sensor calibration data, parameters such as acceptable operating temperature ranges for various components of HVACR system 100, switch patterns such as a plurality of PWM schedules, and/or valve settings such as the information of Table 1 below.

The sensor module of controller 160 receives information from at least one sensor, and may interpret the information according to data received from data storage module 800. For example, the sensor module may convert analogue information from a sensor to digital information using the sensor data.

The commands module of controller 160 issues switching commands to variable frequency drive 155. The commands may be based on one of a plurality of switch patterns stored on data storage module 800, such as PWM patterns. Exemplary PWM patterns are described with respect to FIGS. 5 and 6 below. The commands module may also provide additional commands, such as valve commands according to valve settings stored on data storage module 800.

The criteria evaluation module evaluates information, such as input from the sensors and/or user interface, and determines what commands the commands module will issue. In one aspect, the criteria evaluation module evaluates sensor information received by the sensor module. The criteria evaluation module may compare the sensor data to parameters stored on data storage module 800. In an exemplary embodiment, the criteria evaluation module compares a received temperature of a component of HVACR system 100 to an acceptable range of temperatures, and determines whether to change the pattern of the switching commands issued by the commands module. Further detail regarding the comparison and determination will be described below. The criteria evaluation module may determine other commands to be issued by the commands module, such as valve position commands. The valve position commands may relate to four-way valve 140, and may relate to valves in waste heat recovery circuit 180, as described with respect to FIG. 7 below.

It shall be appreciated that the controls, control routines, and control modules described herein may be implemented using hardware, software, firmware and various combinations thereof and may utilize executable instructions stored in a non-transitory computer readable medium or multiple non-transitory computer readable media. It shall further be understood that controller 160 may be provided in various forms and may include a number of hardware and software modules and components such as those disclosed herein.

Returning to FIG. 1, it shall be further appreciated that waste heat recovery circuit 180 is configured to transfer heat from variable frequency drive 155 to a cooling medium, for example as described below with respect to FIG. 3. In the illustrated embodiment, waste heat recovery circuit 180 is configured as a closed loop cooling circuit configured to circulate a cooling medium, such as a working fluid, between variable frequency drive 155 and second heat exchanger 130. It shall be appreciated that the cooling medium performs both cooling of variable frequency drive 155 and heating of a load such as evaporator. The cooling medium may be circulated by a pump (not shown) which may be controlled by controller 160 or by other another device or system.

Waste heat recovery circuit 180 may alternatively be a non-fluid based transfer device, for example, a heat sink thermally coupling the variable frequency drive 155 and second heat exchanger 130. It is also contemplated that waste heat recovery circuit 180 may be formed integrally with the refrigerant loop or may be in selectable fluid communication with the refrigerant loop. That is, the cooling medium may be the refrigerant circulated in the refrigerant loop. Additionally or alternatively, waste heat recovery circuit 180 may be configured to transfer heat from variable frequency drive 155 to a different portion of the HVACR system 100, for example, a suction line of compressor 110, or a lubricant supply line. In further embodiments waste heat recovery circuit 180 may be configured to transfer heat to a load external to system 100, for example, an external apparatus, device or system which may be related to but not part of system 100 or may be dedicated to one or more functionalities not related or not directly related to those of system 100.

Figure 7:
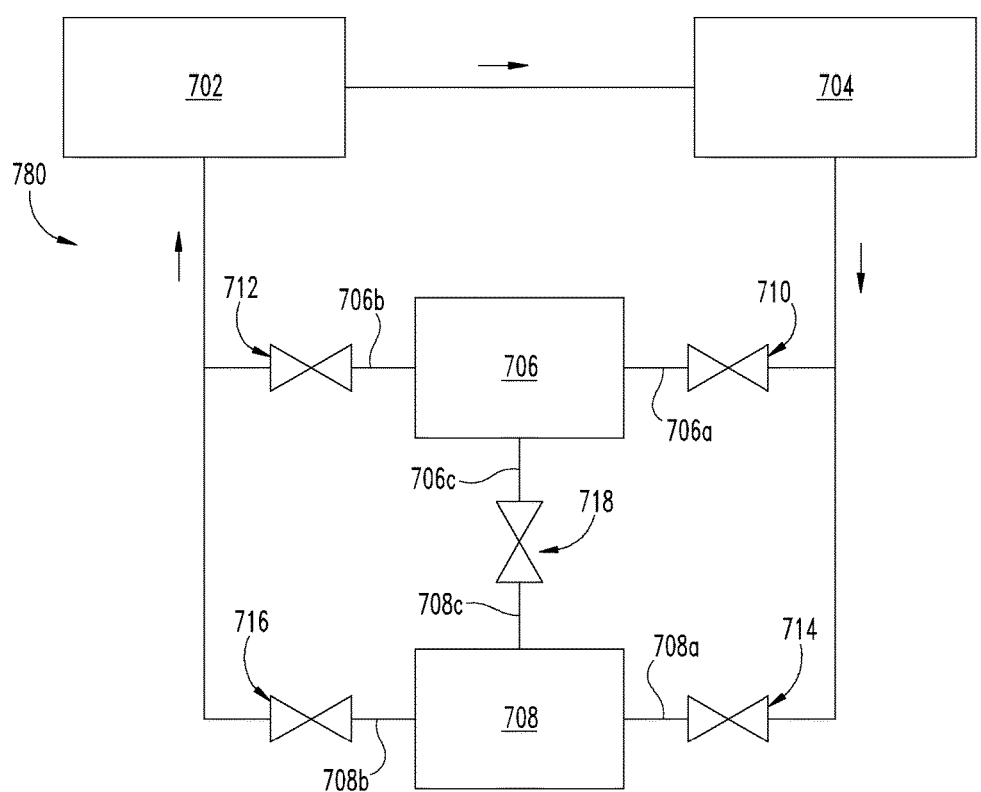
FIG. 7 is a schematic of an exemplary waste heat recovery circuit.

FIG. 7 is a schematic illustration of an alternative embodiment of waste heat recovery circuit 180. Waste heat recovery circuit 780 comprises a pump 702, an inverter heat exchanger 704, a first coolant heat exchanger 706, a second coolant heat exchanger 708, and a plurality of valves 710, 712, 714, 716, and 718.

Pump 702 circulates a cooling medium to inverter heat exchanger 704, through first coolant heat exchanger 706 and/or second coolant heat exchanger 708, depending on the state of valves 710, 712, 714, 716, and 718.

Inverter heat exchanger 704 is configured to receive the cooling medium from pump 702, and discharge the cooling medium toward coolant heat exchangers 706 and 708. Inverter heat exchanger is thermally coupled to an inverter or other switching device of variable frequency drive 155, either in direct contact with a drive structure such as a heat sink or inverter board base structure, or through intermediate thermally conductive elements, and transfers heat from variable frequency drive 155 to the cooling medium.

First coolant heat exchanger 706 is configured to transfer heat between the cooling medium and a first component of HVACR system 100. For example, first coolant heat exchanger 706 may be configured to transfer heat between the cooling medium and first heat exchanger 120. First coolant heat exchanger 706 includes an inlet port 706a, an outlet port 706b, and an inlet/outlet port 706c.

Second coolant heat exchanger 708 is configured to transfer heat between the cooling medium and a second component of HVACR system 100. For example, second coolant heat exchanger 708 may be configured to transfer heat between the cooling medium and second heat exchanger 130. Second coolant heat exchanger 708 includes an inlet port 708a, an outlet port 708b, and an inlet/outlet port 708c.

Each of the plurality of valves is configured to provide selective fluid coupling between various components of waste heat recovery circuit 780. Valve 710 controls flow to inlet port 706a. Valve 712 controls flow from outlet port 706b. Valve 714 controls flow to inlet port 708a. Valve 716 controls flow from outlet port 708b. Valve 718 controls flow between inlet/outlet port 706c and inlet/outlet port 708c. Each of the plurality of valves may be an open/close valve, for example a solenoid valve, or may be a variable flow valve. The plurality of valves may be controlled by controller 160, a separate controller, or other control devices or systems.

The flow of the cooling medium in waste heat recovery circuit 780, and therefore the heat transfer between the components, can be controlled by the open or closed state of the plurality of valves. The valves can be set such that the cooling medium flows only through first coolant heat exchanger 706, only through second coolant heat exchanger 708, to both first and second coolant heat exchangers 706 and 708 in parallel, from first coolant heat exchanger 706 to second coolant heat exchanger 708, or from second coolant heat exchanger 708 to first coolant heat exchanger 706.

For example, when heat transfer is desired only to first coolant heat exchanger 706, valves 710 and 712 are set to an open state, and valves 714, 716, and 718 are set to a closed state. Additional exemplary configurations are detailed in Table 1 below, with "O" representing an open state of the valve, and "X" representing a closed state of the valve.

TABLE 1

|  | 710 | 712 | 714 | 716 | 718 |
| --- | --- | --- | --- | --- | --- |
| 706 only | O | O | X | X | X |
| 708 only | X | X | O | O | X |
| 706 and 708 | O | O | O | O | X |
| 706 to 708 | O | X | X | O | O |
| 708 to 706 | X | O | O | X | O |

An illustrative example of an implementation of waste heat recovery circuit 780 in connection with HVACR system 100 will now be described. Inverter heat exchanger 704 is thermally coupled to variable frequency drive 155. First coolant heat exchanger 706 is thermally coupled to first heat exchanger 120. Second coolant heat exchanger 708 is thermally coupled to second heat exchanger 130. In this and other embodiments, first and second coolant heat exchangers 706 and 708 may be formed integrally with the corresponding heat exchangers 120 and 130. HVACR system 100 is initially operated with four-way valve 140 in the first configuration, wherein the refrigerant flows in the direction of the solid arrows. In this first configuration, first heat exchanger 120 acts as a condenser and becomes relatively hot, and second heat exchanger 130 acts as an evaporator and becomes relatively cold. In other exemplary embodiments, such as large chiller units, first heat exchanger may be a dedicated condenser, second heat exchanger 130 may be a dedicated evaporator, and valving for permitting reversible operation may be omitted and the system may operate in only one direction, rather than reversibly.

In reversible systems, determination is made, for example by controller 160 or by a user, that the system should be reversed. The determination may be based, for example, on a desire to provide chilled water at outlet 122, or heated water at outlet 132. Controller 160 commands four-way valve to the second configuration, wherein the refrigerant flows in the direction of the dashed arrows. In this second configuration, second heat exchanger 130 acts as the condenser, and first heat exchanger 120 acts as the evaporator. Because first heat exchanger 120 is still relatively hot, it will be unable to chill water flowing from inlet 121 to outlet 122 for a period of time. Similarly, because second heat exchanger 130 is still relatively cold, it will be unable to heat water flowing from inlet 131 to outlet 132 for a period of time.

Controller 160 determines that additional heat exchange is desired, and sets the plurality of valves as shown in the "706 to 708" entry in Table 1 above. That is, valves 710, 716, and 718 are set to an open state, and valves 712 and 714 are set to a closed state. The cooling medium flows from pump 702 to inverter heat exchanger 704, where it accepts heat from variable frequency device 155, to first coolant heat exchanger 706 where it accepts additional heat from first heat exchanger 120, to second coolant heat exchanger 708 where it rejects heat to second heat exchanger 130, and back to pump 702. Waste heat recovery circuit 780 may further include additional coolant lines and valves (not shown) such that in an additional configuration, the cooling medium flows from pump 702 to first coolant heat exchanger 706 where it accepts heat from first heat exchanger 120, to inverter heat exchanger 704 where it gains additional heat from variable frequency drive 155, to second coolant heat exchanger 708 where it rejects heat to second heat exchanger 130, and back to pump 702. Controller may further determine whether additional heat is desired, and adjust the command signal provided to variable frequency drive 155 such that variable frequency drive 155 generates additional heat, as described in detail with reference to FIGS. 4-6 below.

Figure 2:
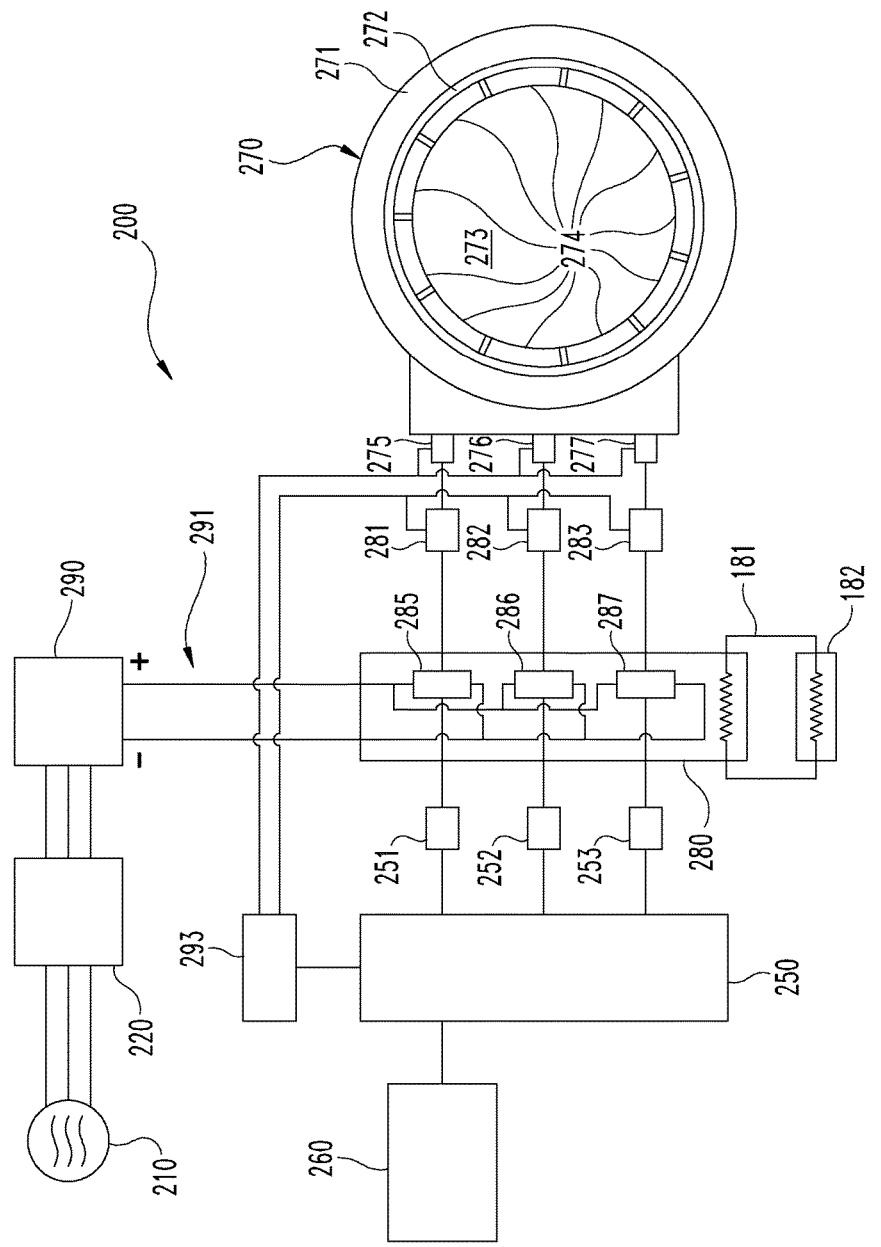
FIG. 2 is a schematic illustration of an exemplary variable frequency drive and permanent magnet motor.

With reference to FIG. 2 there is illustrated an exemplary circuit diagram for a variable frequency motor drive 200. Drive 200 is connected to a power source 210, for example, a 400/480 VAC utility power supply which provides three-phase AC power to line filter module 220. Line filter module 220 is configured to provide harmonic damping to mitigate losses which can arise from harmonic feedback from drive components to power source 210. Line filter module 220 outputs three-phase AC power to a rectifier 290 which converts the AC power to DC power and provides the DC power to a DC bus 291. DC bus 291 is preferably a film capacitor-cased bus which includes one or more film capacitors electrically coupled between positive and negative bus rails. DC bus 291 is connected to inverter 280. Waste heat recovery circuit 181 is thermally coupled to inverter 280 and another component of the HVACR system 100, shown generally as HVACR component 182.

For clarity of illustration and description, rectifier 290, DC bus 291, and inverter 280 are shown as discrete elements. It shall be appreciated, however, that two or more of these components may be provided in a common module, board or board assembly which may also include a variety of additional circuitry and components. It shall be further understood that, in addition to the illustrated 6-pulse rectifier, other multiple pulse rectifiers such as 12-pulse, 18-pulse, 24-pulse or 30-pulse rectifiers may be utilized along with phase shifting transformers providing appropriate phase inputs for 6-pulse, 12-pulse, 18-pulse, 24-pulse, or 30-pulse operation.

Inverter module 280 includes switches 285, 286, and 287 which are connected to the positive and negative rails of DC bus 291. Switches 285, 286, and 287 are preferably configured as IGBT and diode based switches, but may also utilize other types of power electronics switching components such as power MOSFETs or other electrical switching devices. Switches 285, 286, and 287 provide output to motor terminals 275, 276, and 277. Current sensors 281, 282, and 283 are configured to detect current flowing from inverter module 280 to motor 270 and send current information to identification (ID) module 293. Voltage sensors are also operatively coupled with motor terminals 275, 276, and 277 and configured to provide voltage information from the motor terminals to ID module 293.

Waste heat recovery circuit 181 is thermally coupled to inverter module 280, and a cooling medium flowing in waste heat recovery circuit 181 receives heat generated in inverter module 280 by the operation of switches 285, 286, and 287. A pump (not shown) circulates the heated cooling medium to HVACR component 182, which accepts heat from the cooling medium. HVACR component 182 may be, for example, second heat exchanger 130, or a suction line of compressor 110.

In embodiments in which the refrigerant loop circulates a refrigerant-oil mixture, HVACR component 182 may be configured to heat the mixture or the oil using the transferred heat. In such embodiments, HVACR component may heat the mixture or the oil using only the transferred heat, or may use the transferred heat in combination with an additional heating device. HVACR component 182 may be an oil separator, configured to boil the refrigerant, such that the oil is separable from the refrigerant. HVACR component 182 may be an oil purifier configured to boil off refrigerant dissolved in the oil. HVACR component 182 may be an oil heater, configured to heat the oil to a predetermined temperature.

ID module 293 includes burden resistors used in connection with current sensing to set the scaling on current signals ultimately provided to analog to digital converters for further processing. ID module 293 tells the VFD what size it is (i.e. what type of scaling to use on current post ADC) using identification bits which are set in hardware on the ID module 293. ID module 293 also outputs current and voltage information to gate drive module 250 and also provides identification information to gate drive module 250 which identifies the type and size of the load to which gate drive module 250 is connected. ID module 293 may also provide current sensing power supply status information to gate drive module 250. ID module 293 may also provide scaling functionality for other parameters such as voltage or flux signals in other embodiments.

Gate drive module 250 provides sensed current and voltage information to analog to digital converter inputs of digital signal processing (DSP) module 260. DSP module 260 processes the sensed current and voltage information and also provides control signals to gate drive module 250 which signals gate drive module 250 to output voltages to boost modules 251, 252 and 253, which in turn output boosted voltages to switches 285, 286, and 287. The signals provided to switches 285, 286, and 287 in turn control the output provided to terminals 275, 276, and 277 of motor 270.

Motor 270 includes a stator 271, a rotor 273, and an air gap 272 between the rotor and the stator. Motor terminals 275, 276, and 277 are connected to windings provided in stator 271. Rotor 273 includes a plurality of permanent magnets 274. In the illustrated embodiment magnets 274 are configured as surface permanent magnets positioned about the circumference of rotor 273. The rotor is typically constructed using the permanent magnets such that an essentially constant magnetic flux is present at the surface of the rotor. In operation with rotation of the rotor, the electrical conductors forming the windings in the stator are disposed to produce a sinusoidal flux linkage. Other embodiments also contemplate the use of other magnet configurations such as interior magnet configurations as well as inductance motor configurations, reluctance motor configurations and other non-permanent magnet configurations.

Figure 3:
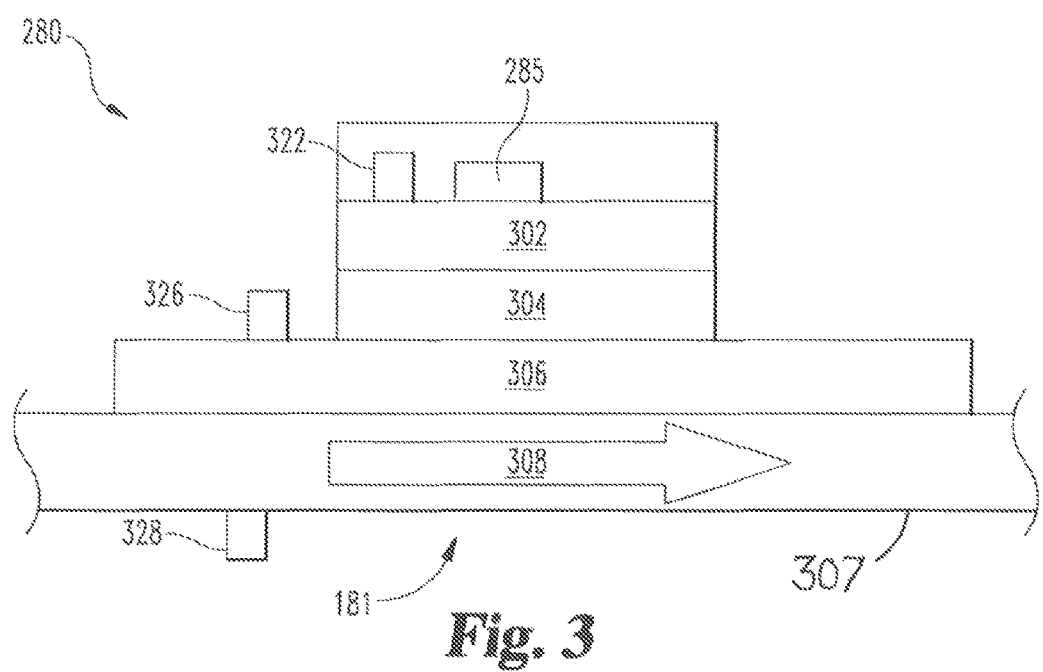
FIG. 3 is a schematic illustration of the inverter module of the system of FIG. 2.

Turning now to FIG. 3, one non-limiting arrangement of a portion of inverter module 280 is schematically illustrated. Inverter module 280 includes a switching device 285 positioned on and in thermal communication with a thermally conductive base or substrate 302. Switching device 285 includes one or more internal switching junctions and in one non-limiting embodiment is in the form of one or more insulated gate bipolar transistors (IGBT's). In another form, switching device 285 is a power MOSFET or another type of switching device. Base 302 may be formed from a variety of different thermally conductive materials or combinations of materials. For example, in one particular but non-limiting form, base 302 is formed from copper or an alloy thereof. A thermal pad 304 is positioned between base 302 and a heat sink 306, although forms in which thermal pad 304 is omitted and base 302 is positioned directly on heat sink 306 are also contemplated. It should further be understood that forms in which one or more additional components are positioned between switching device 285 and base 302 and/or between base 302 and heat sink 306 are possible.

Heat sink 306 is formed of a thermally conductive material and is in thermal communication with base 302 and a cooling medium 308. Cooling medium 308 may be a liquid cooling medium circulated in a conduit 307 of waste heat recovery circuit 181. In this arrangement, heat sink 306 is configured to absorb heat created by switching device 285 during operation of inverter module 280 and transfer the heat to cooling medium 308. Cooling medium 308 may be in any form suitable for absorbing and moving heat away from heat sink 306, examples of which include air, water, glycol or a refrigerant, just to provide a few possibilities. In one particular but non-limiting form, cooling medium 308 is refrigerant of the refrigerant loop that includes compressor 110, first heat exchanger 120, and second heat exchanger 130, and heat is transferred away from heat sink 306 by the refrigerant. In another form, cooling medium 308 could be part of a separate heat transfer system that includes a closed loop of cooling medium 308 and a heat exchanger configured to release heat from cooling medium 308 to HVACR component 182.

Inverter module 280 also includes a number of sensors positioned at different locations and configured to measure temperatures and provide sensed temperature values to controller 160. More particularly, inverter module 280 includes sensor 322 configured to measure temperature of base 302 and provide a sensed temperature value of base 302 to controller 160, sensor 326 configured to measure temperature of heat sink 306 and provide a sensed temperature value of heat sink 306 to controller 160, and sensor 328 configured to measure temperature of cooling medium 308 and provide a sensed temperature value of cooling medium 308 to controller 160. In the illustrated embodiment, inverter module 280 includes a single sensor at each separate location. In other non-illustrated forms however, inverter module 280 includes a plurality of sensors at each location such that a plurality of sensed temperature values are provided to controller 160 for each of base 302, heat sink 306 and cooling medium 308. Forms in which inverter module 280 does not include a sensor at one or more of these locations, or includes sensors at locations in addition to or in lieu of these locations, are also possible.

Figure 4:
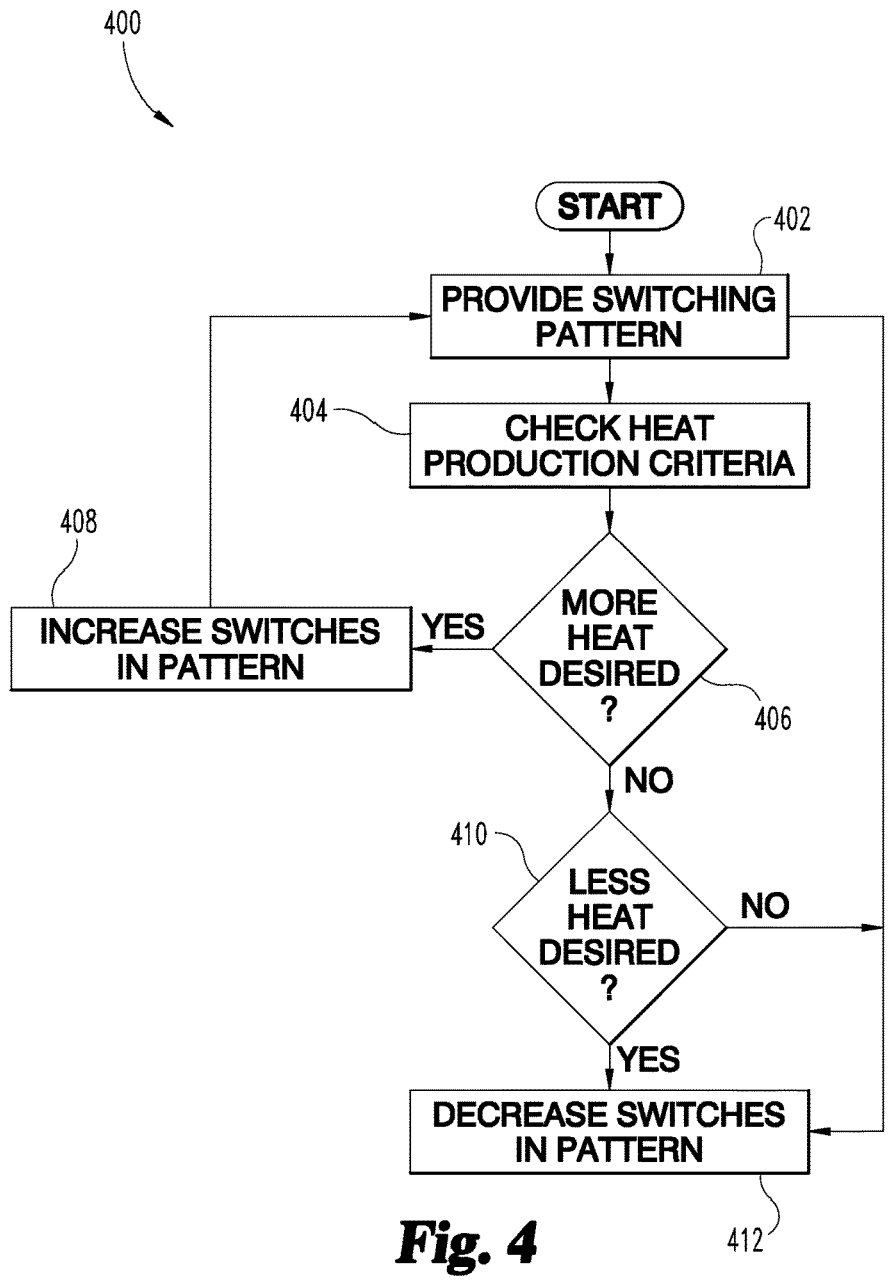
FIG. 4 is a schematic flowchart of a process for altering the heat production of an inverter.

The schematic flow diagram of FIG. 4 and related description which follows provides an illustrative embodiment of performing procedures for modifying the heat generation of an inverter in a system such as that shown in FIG. 2. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transitory computer readable storage medium, where the computer program product comprises instructions causing the computer to execute one or more of the operations, or to issue commands to other devices to execute one or more of the operations.

The exemplary procedure 400 includes providing a switching pattern 402 to inverter module 280 such that switch 285 changes between a first state and a second state according to the switching pattern. Switch 285 generates heat as a byproduct of each change of state, a portion of which is transferred to HVACR component 182 by waste heat recovery circuit 181.

Procedure 400 further includes checking heat production criteria 404, which may include receiving temperature values from a temperature sensor, for example a temperature sensor thermally coupled to HVACR component 182 and/or at least one of temperature sensors 322, 326 and 328. Checking heat production criteria 404 may further include determining if more heat is desired 406 and determining if less heat is desired 410.

Determining if more heat is desired 406 may include comparing a temperature of HVACR component 182 to a desired temperature, and determining whether additional heat transfer to HVACR component 182 is desired. If more heat is desired 406 Y, the number of switches in the switching pattern is increased, leading to increased heat generation by switch 285. It shall be appreciated that increases in the number of switches in the switching pattern may be accomplished through a number of techniques, including increasing the carrier frequency or switching frequency, altering particular regions within the PWM pattern to increase the number of switching events, transitioning from discontinuous to continuous PWM or from more discontinuous to less discontinuous PWM, and combinations of these techniques, among other techniques.

Determining if less heat is desired 410 may include comparing a temperature of at or near switch 285, for example as sensed by temperature sensor 322, 326, and/or 328, and comparing the temperature to a maximum operating temperature of switch 285. If less heat is desired 410 Y, the number of switches in the switching pattern is decreased 412, leading to decreased heat generation by switch 285. It shall be appreciated that decreases in the number of switches in the switching pattern may be accomplished through a number of techniques, including decreasing the carrier frequency or switching frequency, altering particular regions within the PWM pattern to decrease the number of switching events, transitioning from continuous to discontinuous PWM or from less discontinuous to more discontinuous PWM, among other techniques. Determining if less heat is desired 410 may of course be performed prior to or concurrently with determining if more heat is desired 406.

Increasing 408 and decreasing 412 the number of switches in the switching pattern may include selecting a new switching pattern to provide to the inverter module. Exemplary switching patterns will now be described.

FIGS. 5A, 5B, 6A, and 6B illustrate exemplary pulse width modulation (PWM) switching patterns for a three-phase inverter. In each of the figures, the vertical axis is the magnitude of the PWM signal, and the horizontal axis is time.

Figure 5A:
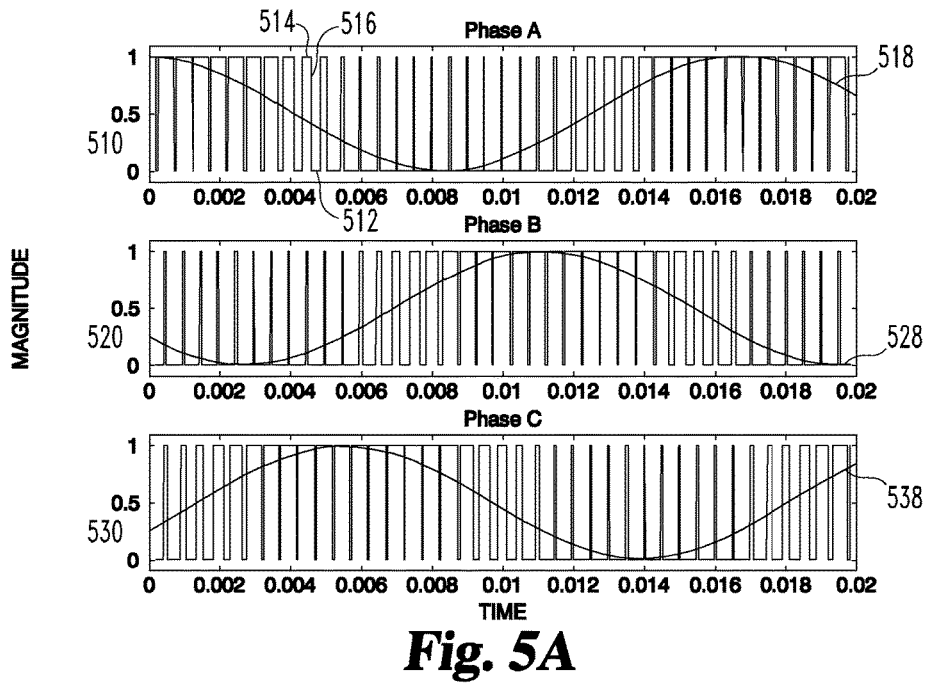
FIG. 5A is an illustrative continuous PWM pattern corresponding to a carrier frequency of 2 kHz.

FIG. 5A illustrates symmetric/continuous PWM switching patterns 510, 520, and 530 corresponding to a switching frequency (sometimes referred to as a carrier frequency) of 2 kilohertz (kHz), though it shall be appreciated that various different switching frequencies may utilized. PWM patterns, such as PWM pattern 510, may be generated, as a simple example, by providing modulating signal 518 to one input of a comparator, and providing a carrier signal (not shown) to another comparator input to output the illustrated pattern 510. The carrier signal may be, for example, a sawtooth or triangular waveform, though other carrier signals are contemplated. In embodiments utilizing a carrier signal, the frequency of the carrier signal is the switching frequency. It is also contemplated PWM patterns, such as PWM pattern 510, may be generated by a number of additional or alternate PWM generation techniques such as delta, delta-sigma, space vector modulation, statistical techniques, direct torque control, or time proportioning techniques, among others. Regardless of the technique which is utilized the switching frequency is correlated to the number of switching events per unit time.

PWM pattern 510 comprises signals of a first magnitude 512, signals of a second magnitude 514, and transition regions 516. When provided to a switching device, such as switch 285, first magnitude signals 512 command switch 285 to a first state, second magnitude signals 514 command switch 285 to a second state, and transition regions 516 correspond to a change between the first and second states. Each change between the first and second states generates heat. When inverter module 280 is configured to supply power to motor 170, a synthesized current waveform is produced in motor 170.

For three-phase operation of inverter module 280, PWM pattern 520 may be provided to switch 286 based upon modulating signal 528, and PWM pattern 530 may be provided to switch 287 based upon modulating signal 538. Modulating signals 518, 528 and 538 are preferably sinusoidal waveforms of the same frequency with a phase separation of 120° which, under normal system operation, are effective to provide corresponding synthesized sinusoidal current waveforms with a phase separation of 120° in the motor. It is also contemplated that other multi-phase systems could be utilized.

Figure 5B:
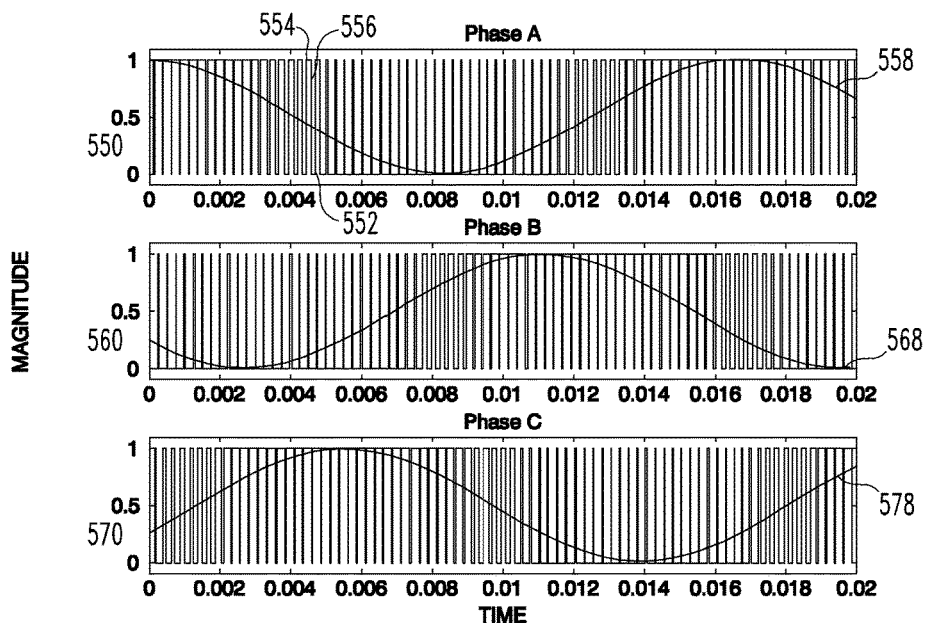
FIG. 5B is an illustrative continuous PWM pattern corresponding to a carrier frequency of 4 kHz.

FIG. 5B illustrates symmetric PWM switching patterns 550, 560, and 570 corresponding to a switching frequency of 4 kHz. In the illustrated embodiment, switching patterns 550, 560, and 570 are obtained by comparing modulating signals 558, 568, and 578 to a carrier signal having a 4 kHz frequency, though they may also be generated using the other techniques described above. PWM pattern 550 comprises signals of a first magnitude 552, signals of a second magnitude 554, and transition regions 556. When PWM pattern 550 is provided to inverter module 280, a synthesized current waveform is produced in motor 170. PWM pattern 550 has a greater number of transition regions than PWM pattern 510, and therefore produces more waste heat.

For three-phase operation of inverter module 280, PWM pattern 560 may be provided to switch 286 based upon modulating signal 568, and PWM pattern 570 may be provided to switch 287 based upon modulating signal 578. Modulating signals 558, 568 and 578 are preferably sinusoidal waveforms of the same frequency with a phase separation of 120° which, under normal system operation, are effective to provide corresponding synthesized sinusoidal current waveforms with a phase separation of 120° in the motor. It is also contemplated that other multi-phase systems could be utilized.

Figure 6A:
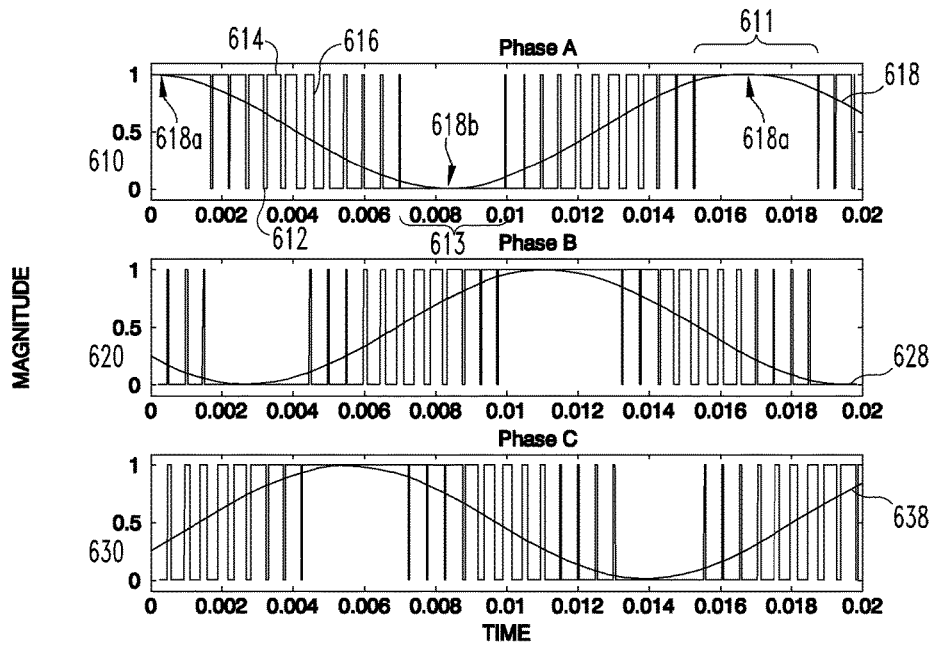
FIG. 6A is an illustrative discontinuous PWM pattern corresponding to a carrier frequency of 2 kHz.

FIG. 6A illustrates discontinuous PWM switching patterns 610, 620, and 630 corresponding to a switching frequency of 2 kilohertz (kHz). PWM pattern 610 comprises signals of a first magnitude 612, signals of a second magnitude 614, and transition regions 616. When PWM pattern 610 is provided to inverter module 280, a synthesized current waveform is produced in motor 170. PWM pattern 610 includes an extended first magnitude signal 613 and/or an extended second magnitude signal 611. Extended first magnitude signal 613 corresponds to a trough 618*b* of modulating signal 618, and extended second magnitude signal 611 corresponds to a peak 618*a* of modulating signal 618. Each of the extended signals 611 and 613 is of a duration corresponding to a predetermined percentage of the period of modulating signal 618, for example ten to twenty percent. The predetermined percentage may vary according to heat generation criteria and acceptable distortion of the synthesized sinusoidal current waveform seen in the motor. PWM pattern 610 has fewer transition regions than PWM patterns 510 and 550, and therefore produces less waste heat.

For three-phase operation of inverter module 280, PWM pattern 620 may be provided to switch 286 based upon modulating signal 628, and PWM pattern 630 may be provided to switch 287 based upon modulating signal 638. Modulating signals 618, 628 and 638 are preferably sinusoidal waveforms of the same frequency with a phase separation of 120° which, under normal system operation, are effective to provide corresponding synthesized sinusoidal current waveforms with a phase separation of 120° in the motor. It is also contemplated that other multi-phase systems could be utilized.

Figure 6B:
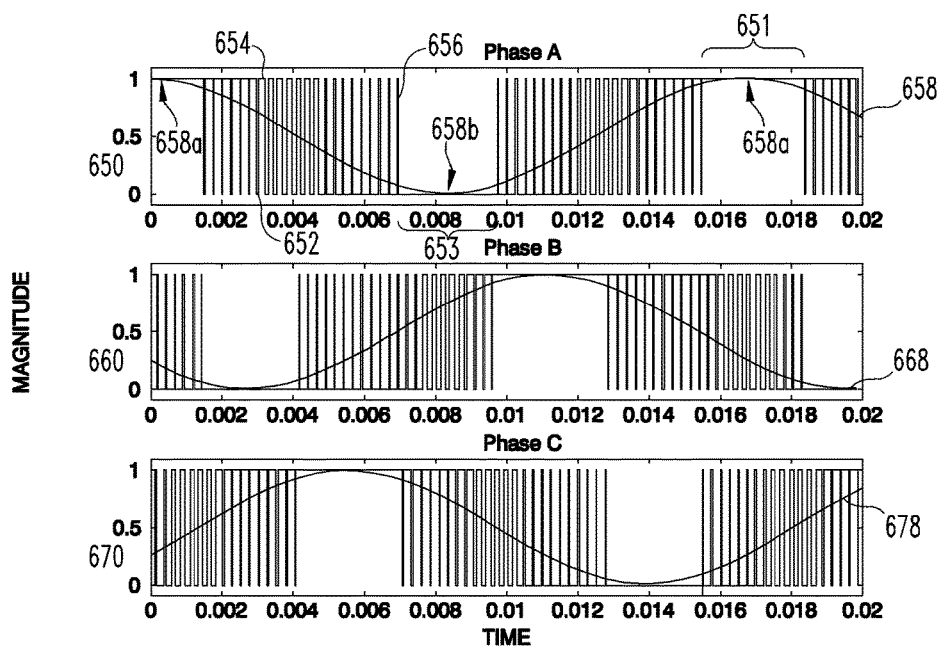
FIG. 6B is an illustrative discontinuous PWM pattern corresponding to a carrier frequency of 4 kHz.

FIG. 6B illustrates discontinuous PWM switching patterns 650, 660, and 670 corresponding to a switching frequency of 4 kHz. PWM pattern 650 comprises signals of a first magnitude 652, signals of a second magnitude 654, and transition regions 656. When PWM pattern 650 is provided to inverter module 280, a synthesized current waveform is produced in motor 170. PWM pattern 650 includes an extended first magnitude signal 653 and/or an extended second magnitude signal 651. Extended first magnitude signal 653 corresponds to a trough 658*b* of modulating signal 658, and extended second magnitude signal 651 corresponds to a peak 658*a* of modulating signal 658. Each of the extended signals 651 and 653 is of a duration corresponding to a predetermined percentage of the period of modulating signal 658, for example ten to twenty percent. The predetermined percentage may vary according to heat generation criteria and acceptable distortion of the synthesized sinusoidal current waveform seen in the motor. PWM pattern 650 has more transition regions than PWM pattern 610, and fewer transition regions than PWM pattern 550.

For three-phase operation of inverter module 280, PWM pattern 660 may be provided to switch 286 based upon modulating signal 668, and PWM pattern 670 may be provided to switch 287 based upon modulating signal 678. Modulating signals 658, 668 and 678 are preferably sinusoidal waveforms of the same frequency with a phase separation of 120° which, under normal system operation, are effective to provide corresponding synthesized sinusoidal current waveforms with a phase separation of 120° in the motor. It is also contemplated that other multi-phase systems could be utilized.

While the switching patterns have been illustratively described as PWM patterns corresponding to carrier frequencies of 2 kHz and 4 kHz, the invention is not so limited. PWM patterns of any suitable carrier frequency are contemplated, as is variation among and between the different switching frequencies and patterns disclosed herein as well as other switching frequencies and patterns. While four exemplary switching patterns have been described, any number of switching patterns may be available to choose between, so long as the set of available switching patterns includes switching patterns having a different number of switches per unit time.

Furthermore, in a three-phase power inversion system, different switching patterns may be provided to each of the switches. Temperature sensors may sense the temperature of each switch, and controller 160 may alter the switching pattern of one or more sensors based on the sensed temperatures. Discontinuous PWM patterns may employ extended signals of varying durations.

With reference to the above-described systems and methods, a number of non-limiting, illustrative examples will now be described.

In certain exemplary embodiments, controller 160 provides a 2 kHz symmetric PWM pattern 510 to an inverter module 280 of variable frequency drive 155. HVACR component 182 is a suction line of compressor 110, and waste heat recovery circuit 181 transfers heat to suction line 182. A temperature sensor senses a temperature of a refrigerant in suction line 182. Controller 160 compares the sensed temperature to a predetermined superheat temperature of the refrigerant. If the sensed temperature is not greater than the predetermined superheat temperature, controller 160 changes the PWM pattern to a 4 kHz symmetric PWM pattern 550, increasing the heat generated by variable frequency drive 155 and transferred to suction line 182 through waste heat recovery circuit 180.

In certain exemplary embodiments, a refrigerant loop circulates a working fluid mixture comprising a refrigerant and an oil of a higher density than the refrigerant. During system idle time, oil settles in the bottom of second heat exchanger 130. Oil-rich working fluid is transferred from the bottom of second heat exchanger 130 to an oil separator defining HVACR component 182. The system is started, and controller 160 provides a 4 kHz symmetric PWM pattern 550 to variable frequency drive 155. Heat is transferred from variable frequency drive 155 to the oil separator by waste heat recovery circuit 181. The transferred heat boils the refrigerant portion of the working fluid. The boiled refrigerant is discharged from the oil separator to the compressor suction line, and the separated oil is transferred to an oil intake of compressor 110. After a predetermined time has elapsed, controller 160 changes the PWM pattern to a 2 kHz symmetric PWM pattern 510.

In certain exemplary embodiments, an oil supply line 182 provides a lubricating oil to compressor 110. Controller 160 provides a 2 kHz discontinuous PWM pattern 610 to inverter module 280. Heat is transferred by waste heat recovery circuit 181 from inverter module 280 to an oil supply line defining HVACR component 182. A temperature sensor senses the oil temperature. Controller 160 determines that the oil temperature is too low, resulting in elevated oil viscosity. Controller 160 changes the PWM pattern to a 2 kHz continuous PWM pattern 510 to increase the heat generated by inverter module 280 and transferred to the oil supply line.

In certain exemplary embodiments controller 160 provides 2 kHz symmetric PWM patterns 510, 520, and 530 to switches 285, 286, and 287, respectively, inverter module 280 thereby providing three-phase power to motor 170. Heat is transferred by waste heat recovery circuit 181 from inverter module 280 to HVACR component 182. Controller 160 determines that additional heat is desired at HVACR component 182, the temperatures of switches 285 and 286 are within an acceptable range, and the temperature of switch 287 is near a failure temperature. Controller 160 provides 4 kHz symmetric PWM patterns 550 and 560 to switches 285 and 286, and provides 2 kHz discontinuous PWM pattern 630 to switch 287.

Figure 9:
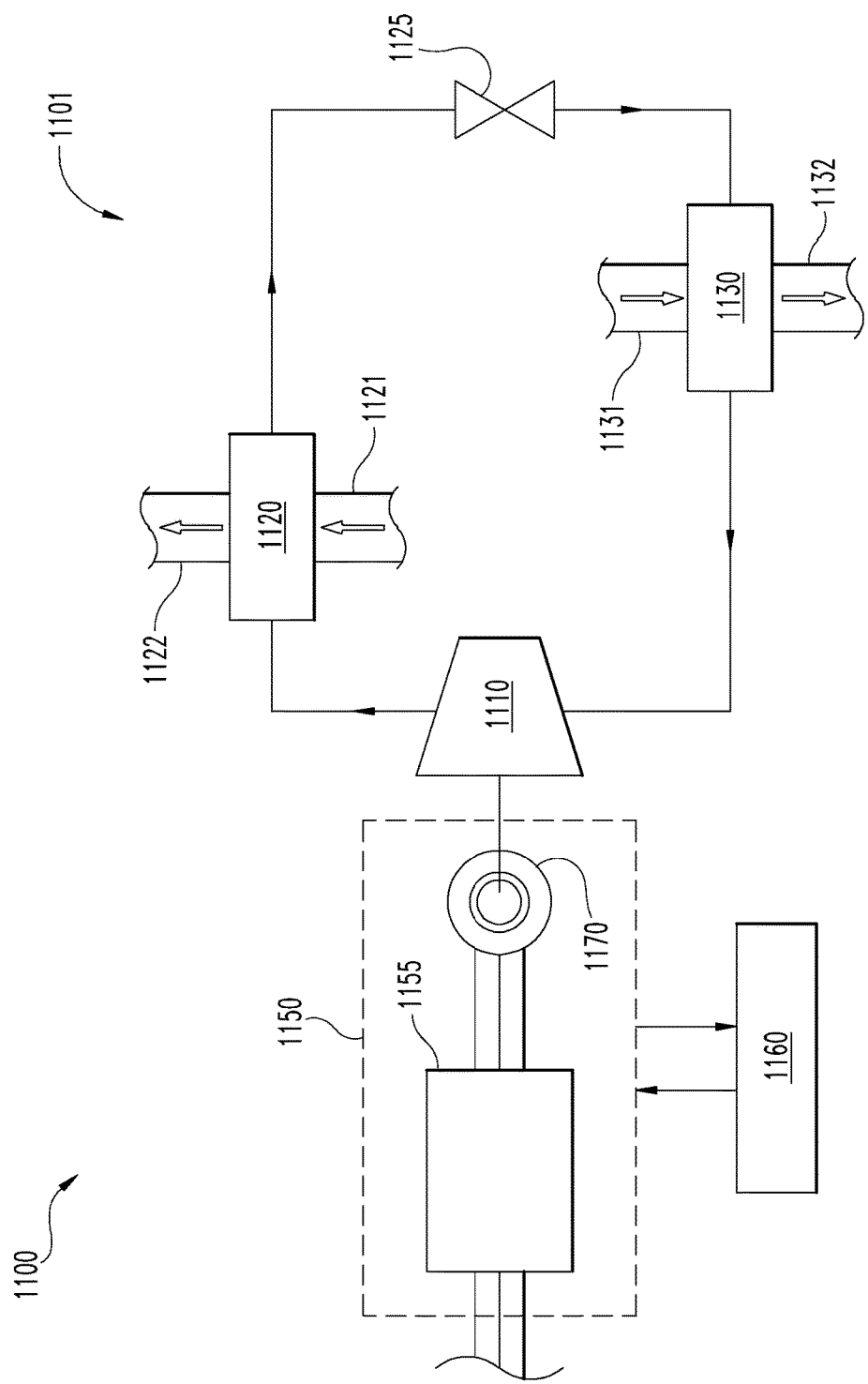
FIG. 9 is a schematic illustration of an exemplary HVACR system

With reference to FIG. 9 there is illustrated an exemplary HVACR system 1100 which includes a refrigerant loop 1101 comprising a compressor 1110, a condenser 1120, an expander 1125 such as an expansion valve, and an evaporator 1130. Refrigerant flows through refrigerant loop 1101 from compressor 1110 to condenser 1120 to expander 1125 to evaporator 1130 and back to compressor 1110. Variable frequency drive 1155 may be configured as a variable frequency motor drive 200 having an inverter module 280 as described above in connection with FIG. 2. Various embodiments of refrigerant loop 1101 may also include additional elements including, for example, valves for controlling or reversing refrigerant flow, refrigerant filters, economizers, oil separators and/or cooling components and flow paths for various system components.

Compressor 1110 is driven by a drive unit 1150 including a permanent magnet electric motor 1170 which is driven by a variable frequency drive 455. In the illustrated embodiment, variable frequency drive 1155 is configured to output a three-phase PWM drive signal, and motor 1170 is a surface mounted permanent magnet motor. Use of other types and configurations of variable frequency drives and electric motors such as interior magnet permanent magnet motors, reluctance motors, or inductance motors are also contemplated. It shall be appreciated that the principles and techniques disclosed herein may be applied to a broad variety of drive and motor configurations.

Condenser 1120 is configured to transfer heat from compressed refrigerant received from compressor 1110. In the illustrated embodiment condenser 1120 is a water cooled condenser which receives cooling water at an inlet 1121, transfers heat from the refrigerant to the cooling water, and outputs cooling water at an outlet 1122. It is also contemplated that other types of condensers may be utilized, for example, air cooled condensers or evaporative condensers. It shall further be appreciated that references herein to water include water solutions comprising additional constituents unless otherwise limited.

Expander 1125 is configured to receive refrigerant from condenser 1120, and to expand the received refrigerant to decrease its temperature. In the illustrated embodiment, expander 1125 is a throttle valve. It is also contemplated that other types of expanders may be utilized, for example, capillary tubes or any other device configured to provide expansion (preferably controllable expansion) of refrigerant. It is further contemplated that expander 1125 may be formed integrally with evaporator 1130.

Evaporator 1130 is configured to receive refrigerant from expander 1125, and transfer heat from a medium to the refrigerant. In the illustrated embodiment evaporator 1130 is configured as a water chiller which receives water provided to an inlet 1131, transfers heat from the water to the refrigerant, and outputs chilled water at an outlet 1132. It is contemplated that a number of particular types of evaporators may be utilized, including dry expansion evaporators, flooded type evaporators, bare tube evaporators, plate surface evaporators, and finned evaporators among others.

HVACR system 1100 further includes a controller 1160 which outputs control signals to variable frequency drive 1155 to control operation of the motor 1170 and compressor 1110. Controller 1160 also receives information about the operation of drive unit 1150. In exemplary embodiments, controller 1160 receives information relating to the temperature of various components of HVACR system 1100. In further embodiments, controller 1160 receives information relating to motor current, motor terminal voltage, motor speed, and/or other operational characteristics of the motor.

Figure 10:
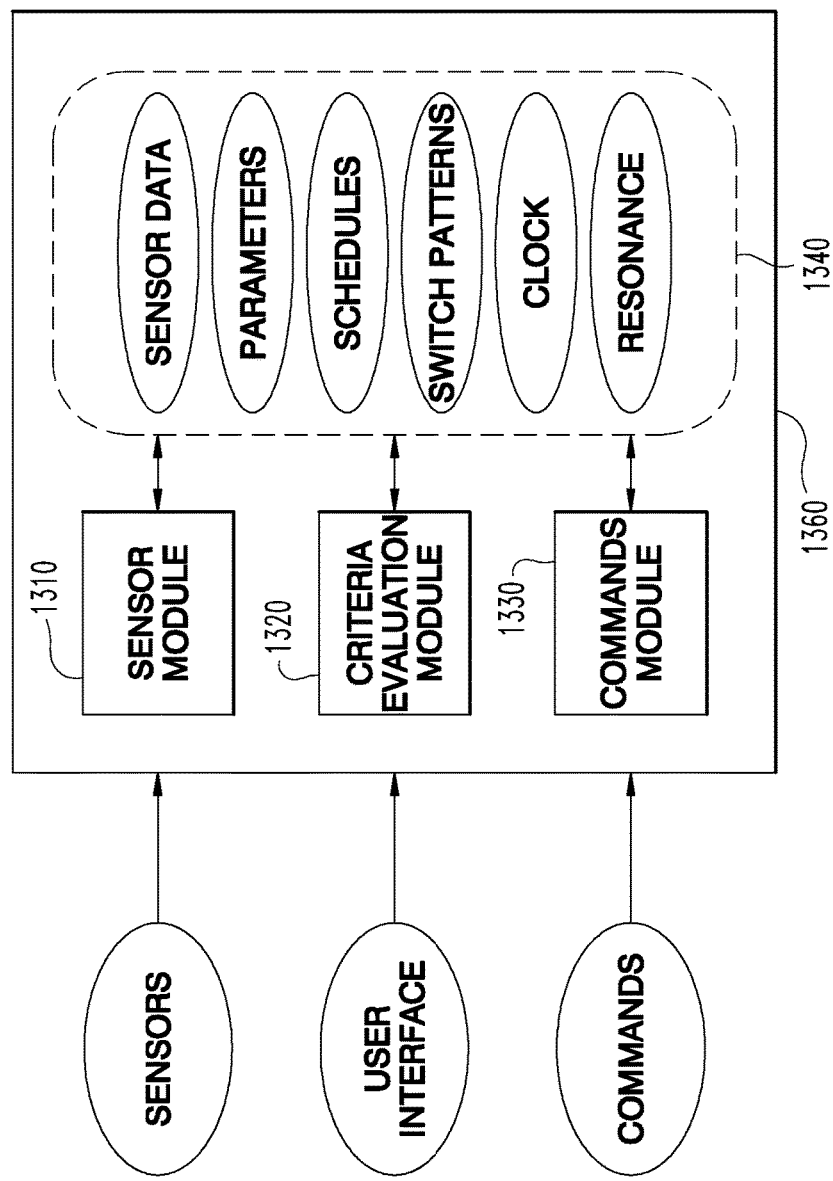
FIG. 10 is a schematic illustration of a controller usable with the HVACR system of FIG. 9.

With reference now to FIG. 10, further details of an illustrative embodiment of controller 1360 will be described. Exemplary controller 1360 includes a sensor module 1310, a criteria evaluation module 1320, a commands module 1330, and a data storage module 1340. Controller receives 1360 information from at least one sensor, for example temperature sensors provided to various components of HVACR system 1100, and may further be in communication with a user interface. Controller 1360 provides commands to at least variable frequency drive 1155, and may further provide commands to other components of HVACR system 1100.

It shall be appreciated that the controls, control routines, and control modules described herein may be implemented using hardware, software, firmware and various combinations thereof, and may utilize executable instructions stored in a non-transitory computer readable medium or multiple non-transitory computer readable media. Likewise, while various functionalities are referred to in connection with individual modules, it shall be understood that references to individual modules does not exclude or prevent the individual modules from being implemented in a common module with multiple sub-functionalities or distributed across multiple discrete modules operating in concert. It shall further be understood that controller 1360 may be provided in various forms and may include a number of hardware and software modules and components such as those disclosed herein.

Data storage module 1340 is configured to store data on one or more non-transitory computer readable media for use by other modules of controller 1360. Data storage module 1340 may store, for example, sensor data such as sensor calibration data, parameters such as audible noise profiles, acoustic noise profiles, switch patterns, and a clock. Data storage module 1340 may further store schedules for target audible noise profiles 1452. For example, a schedule may indicate that a first audible noise profile is to be used during day-time hours when cooling demand is high, and a second audible noise profile is to be used during night-time hours, when quiet operation is desired. Schedules may further include weighting factors 1456, discussed below. The schedules may be adjustable by the user-interface. Data storage module 1340 may further include resonance information, for example relating to the natural frequencies of one or more components of variable frequency drive 1155, motor 1170, and compressor 1180.

In the illustrated embodiment, sensor module 1310 receives information from at least one sensor, and may interpret the information according to data received from data storage module 1340. For example, sensor module 1310 may convert analogue information from a sensor to digital information using the sensor data. Sensor module may receive information regarding temperature of a component, electrical noise, feedback, and acoustic noise. It is also contemplated that, in certain embodiments, controller 1360 may not include sensor module 1310, and certain conditions may be determined by other methods. For example, data storage module 1340 may include look-up tables relating each switching pattern 1480 to one or more conditions.

Criteria evaluation module 1320 is configured to evaluate information—for example according to the procedure described with respect to FIG. 11 below—and select a switching pattern based on the evaluation of information. In the illustrated embodiment, criteria evaluation module 1320 evaluates information stored on data storage module 1340, as well as sensor information received by sensor module 1310. Criteria evaluation module 1320 may compare the sensor data to parameters stored on data storage module 1340. It is also contemplated that controller 1360 may not include sensor module 1310, and that criteria evaluation module 1320 may select a switching pattern based only on data stored in data storage module 1340. Criteria evaluation module 1320 may determine other commands to be issued by commands module 1330, such as valve commands for valves in system 1100.

Commands module 1330 is configured to generate and output switching commands according to the switching pattern selected by criteria evaluation module 1320. The switching commands are provided to inverter module 280, thereby operating switches 285, 286, and 287 to provide output to terminals 275, 276, and 277 of motor 270, as described above in connection with FIG. 2. Commands module 1330 may also provide additional commands, such as valve commands for valves in system 1100. It is contemplated that another controls module, such as one implemented through a separate controller, may also be utilized.

Figure 11:
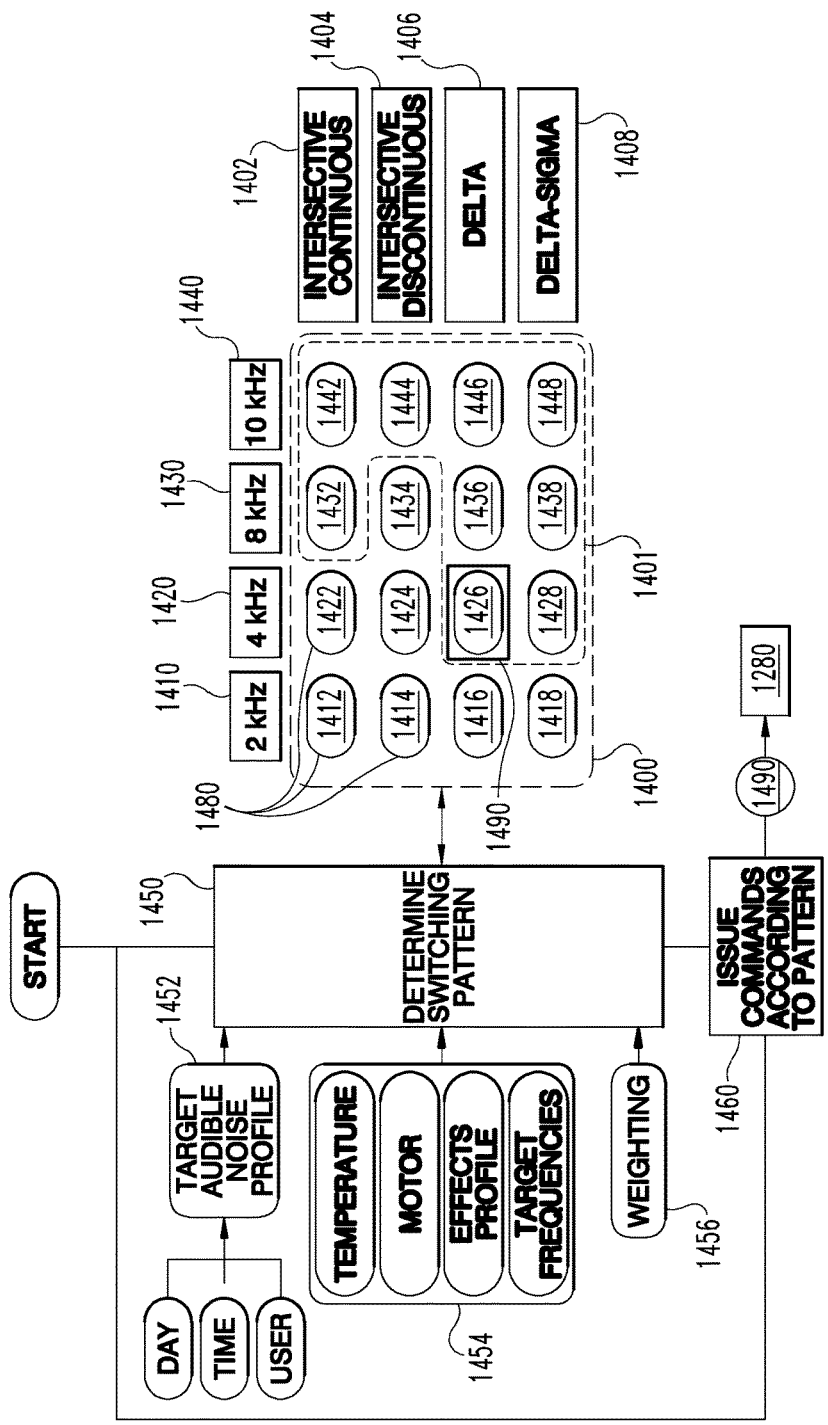
FIG. 11 is a flowchart illustrating an exemplary process for altering the audible noise production of the system of FIG. 2.

The schematic flow diagram of FIG. 11 and related description which follows provides an illustrative embodiment of performing procedures for modifying the audible noise generation of an inverter in a system such as that shown in FIG. 2. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transitory computer readable storage medium, where the computer program product comprises instructions causing the computer to execute one or more of the operations, or to issue commands to other devices to execute one or more of the operations.

The procedure generally includes determining 1450 an optimal switching pattern 1490 selected from a switching pattern set 1400, determining 1450 being based at least in part upon a target audible noise profile 1452 and other factors 1454, and issuing 1460 switching commands to inverter module 1280 according to selected pattern 1490.

Switching pattern set 1400 includes a plurality of switching patterns 1480. In the illustrated embodiment, set 1400 includes switching patterns generated by different PWM generation techniques 1402, 1404, 1406, and 1408, at different carrier frequencies 1410, 1420, 1430, and 1440.

In the illustrated embodiment, the PWM techniques include intersective continuous 1402 (illustrative examples of which are described with respect to FIGS. 5A and 5B above), intersective discontinuous 1404 (illustrative examples of which are described with respect to FIGS. 6A and 6B above), delta modulation 1406, and delta-sigma modulation 1408. It is contemplated that fewer, additional, or alternative techniques may be employed to generate set 1400. For example, set 1400 may include switching patterns 1480 generated by techniques such as space vector modulation, statistical techniques, direct torque control, or time proportioning techniques, among others. In the illustrated embodiment, only the intersective technique employs discontinuities. It is also contemplated that discontinuities may be employed in fewer, additional, or alternative techniques, and that the duration of the discontinuities may be modified. Regardless of which technique is utilized, the carrier frequency is correlated to the rate of switch commands, and thus the acoustic noise produced (discussed below).

In the illustrated embodiment, carrier frequencies include 2 kHz 1410 (illustrative examples of which are described with respect to FIGS. 5A and 6A above), 4 kHz 1420 (illustrative examples of which are described with respect to FIGS. 5B and 6B above), 8 kHz 1430, and 10 kHz 1440. It is contemplated that fewer, additional, or alternative carrier frequencies may be employed to generate set 1400. In the illustrated embodiment, the carrier frequencies are discrete values. It is also contemplated that a continuum of frequencies may be available to criteria evaluation module 1320, for example in the form of a frequency slider.

Determining 1450 a switching pattern (hereinafter determining 1450) may include selecting an acceptable audible noise profile 1452, and selecting a switching pattern based at least in part on audible noise profile 1452. Determining 1450 may further take into account other factors 1454, and may weigh the importance of the audible noise profile 1452 and other factors 1454 according to weighting factors 1456.

The selection of the acceptable audible noise profile may itself be based on one or more factors, such as day, time, and user selection. For example, if HVACR system 1100 is in a commercial building, quieter operation during the day may be desired, whereas in a residential building, quiet operation may be desired at night. Additionally, zoning ordinances may limit the acceptable noise generation during certain hours. In any case, audible noise profile 1452 sets a target maximum audible noise level upon which determining 1450 is at least partly based.

Target audible noise profile 1452 may be selected from a set of predetermined audible noise profiles, or may be generated at the time of determining 1450. An audible noise profile may include sound pressure levels of a plurality of frequency ranges (for example in dB SPL), or may be a single measurement, for example a weighted measurement such as A-weighted decibels (dBA). For example, a first audible noise profile may set a maximum dB SPL of a first frequency range and a second frequency range, while a second audible noise profile may only include a maximum dB SPL of the first frequency range, and be silent as to amplitudes of other frequency ranges.

Determining 1450 includes evaluating other factors 1454, including switching pattern effects. When provided to inverter module 280, each switching pattern 1480 will have a different effect on the system. For example, in addition to changing the acoustic noise profile (discussed below), changing the switching pattern may change electrical noise generation, heat generation, inverter efficiency, current ripple, and the quality of the synthesized current waveform seen in the motor. These effects are often competing concerns, in that changing the switching pattern to reduce a first negative effect may have the result of increasing a second negative effect. For example, increasing the switching frequency may reduce audible noise and current ripple, while increasing electrical noise and heat generation. These effects, as well as other factors 1454, may be assigned weighting factors 1456 according to their relative importance. For example, surface mounted permanent magnet motors require relatively high quality synthesized current waveforms. In systems using such motors, electrical noise reduction may be given greater weighting factor 1456 than in other systems.

Each of the switching pattern effects may be calculated based on known parameters, or may be measured when the switching pattern is used. Each switching pattern 1480 may be associated with a corresponding switching pattern effects profile. For example, data storage module 1340 may include look-up tables with empirically derived data relating to the effects of one or more switching patterns 1480.

The effects to be considered as one of other factors 1454, including at least the acoustic noise profile, are included in a switching pattern effects profile (EFFECTS). Other factors 1454 may further include a temperature. For example, the inverter temperature may be considered as one of other factors 1454, and optimal pattern may be selected such that inverter module 280 does not overheat. Other factors 1454 may include motor information, such as motor speed and motor load. For example, a higher quality of the synthesized current waveform may be required at certain motor speeds. Other factors 1454 may further include natural frequencies of one or more components, as discussed below.

Operation of inverter module 280 according to the selected switching pattern 1490 results in acoustic noise production by one or more of the inverter, the motor, and the compressor. The operation of switches 285, 286, and 287 changes the electromagnetic field in motor 270. Varying electromagnetic fields can cause magnetically susceptible components of motor 270 to vibrate at a frequency corresponding to the switching rate, resulting in acoustic noise at the frequency of vibration. The changing electromagnetic field also creates variations in the torque generated by motor 270. The varying torque can result in vibration of one or more components of motor 270 and compressor 1110 at a frequency corresponding to the switching rate, which in turn results in acoustic noise at the frequency of vibration.

When the operation causes a frequency of vibration at or near a natural frequency of a component of variable frequency drive 1155, motor 1170, or compressor 1110, the acoustic noise becomes much more pronounced. Furthermore, this can be a cumulative effect, in that continued excitation of the component at its natural frequency causes increasingly higher amplitudes of vibration. In certain circumstances, this may even cause damage to the component or its surroundings. Determining 1450 may include considering the natural frequencies of one or more components as one of other factors 1454.

Acoustic noise at other frequencies—for example, due to the rotation of rotor 273, or harmonics of the frequency of vibration—may also be produced. The set of acoustic noises produced by the system is referred to herein as an acoustic noise profile. An acoustic noise profile may include sound pressure levels of a plurality of frequency ranges (for example in dB SPL), or may be a single measurement, such as A-weighted decibels.

When the vibration frequency is in the human audible range, the acoustic noise is audible. The average human adult ear has an audible range of about 16 Hz to 16 kHz, and is most sensitive to frequencies of about 2 kHz to 5 kHz. Generally speaking, tones of relatively higher frequencies are less readily perceived by the human ear than a tone of the same decibel level having a relatively lower frequency. For example, according to ISO 226:2003, a 10 kHz tone at 65 dB SPL is perceived as being roughly the same loudness as a 3 kHz tone at 45 dB SPL.

In certain embodiments, determining 1450 includes selecting the switching pattern 1490 from a subset 1401 that includes only switching patterns 1480 that do not violate a critical condition. For example, when quiet operation of HVACR system 1100 is of the highest importance, weighting factors 1456 may indicate target audible noise profile 1452 as a critical condition. In such a case, determining 1450 includes creating subset 1401 to include only switching patterns 1480 corresponding to acoustic noise profiles that do not violate target audible noise profile 1452. Determining 1450 may then select the optimal pattern 1490 based on other factors 1454, for example using other weighting factors 1456. Alternatively, one or more other factors 1454 may be set as critical conditions, and optimal pattern 1490 may be selected from subset 1401 to comply with target audible noise profile 1452.

In other embodiments, determining 1450 includes evaluating audible noise profile 1452 and other factors 1454 simultaneously according to weighting factors 1456. For example, in certain cases it may be more important to meet the load requirements than to meet target audible noise profile 1452. In such a case, the load criterion would be given a higher weighting factor 1456 than audible noise profile 1452, and optimal pattern 1490 may be selected such that the acoustic noise profile violates audible noise profile 1452 by only an amount needed to meet the load requirements. In certain cases, weighting factors 1456 may result in selected pattern 1490 not meeting any of the criteria, but having the optimal balance (with respect to weighting factors 1456) between the competing criteria. Weighting factors 1456 may themselves be based on a number of conditions, such as for example, day, time, user selection, temperatures and load requirements.

Once optimal switching pattern 1490 has been selected, optimal switching pattern 1490 is provided 1460 to inverter module 280. Providing 1460 may be performed, for example, by commands module 1330. Furthermore, optimal switching pattern 1490 may comprise a plurality of different switching patterns 1480, such that a number of criteria may be satisfied. For example, it may be determined that a first switching pattern 1412 and a second switching pattern 1424 provide an optimal balance of audible noise and other factors, except for the fact that first pattern 1412 excites a first component at its natural frequency, and second pattern 1424 excites a second component at its natural frequency. In such a case, optimal pattern 1490 may include one or more cycles of first pattern 1412 followed by one or more cycles of second pattern 1424. The first component would be excited at its natural frequency for only the duration of the commands according to first pattern 1412, and would be dampened to vibration of a lower amplitude during the commands according to second pattern 1424. Similarly, the second component would be excited at its natural frequency for only the duration of the commands according to second pattern 1424, and would be dampened to vibration of a lower amplitude during the commands according to first pattern 1412.

In certain exemplary embodiments, a first schedule includes weighting factors 1456 indicating target audible noise profile 1452 is a critical condition, and a high weighting factor is assigned to system efficiency. A second schedule includes weighting factors 1456 indicating a predetermined temperature of inverter module 280 is a critical condition, a high weighting factor is assigned to target audible noise profile 1452, and a lower weighting factor is assigned to electrical noise generation.

In certain exemplary embodiments, the quality of the synthesized current waveform is given a lower weighting factor 1456 for a first range of motor speeds, a higher weighting factor 1456 for a second range of motor speeds, and is considered a critical condition at a third range of motor speeds.

It shall be understood that the exemplary embodiments summarized and described in detail above and illustrated in the figures are illustrative and not limiting or restrictive. Only the presently preferred embodiments have been shown and described and all changes and modifications that come within the scope of the invention are to be protected. It shall be appreciated that the embodiments and forms described below may be combined in certain instances and may be exclusive of one another in other instances. Likewise, it shall be appreciated that the embodiments and forms described below may or may not be combined with other aspects and features disclosed elsewhere herein. It should be understood that various features and aspects of the embodiments described above may not be necessary and embodiments lacking the same are also protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system comprising:
   a compressor, an expander, a first heat exchanger, and a second heat exchanger, fluidly coupled to form a vapor-compression circuit containing a first working fluid;
   an electric motor configured to drive the compressor;
   an inverter comprising a plurality of switches, the inverter configured to provide an output voltage to the electric motor through operation of the switches;
   a waste heat recovery circuit including a conduit containing a second working fluid, the conduit being in conductive thermal contact with the inverter and in conductive thermal contact with the second heat exchanger; and
   a controller configured to determine whether increased heat of the inverter is desired in response to a sensed temperature of the system and a heat production criterion, and in response to determining that increased heat is desired, increase heat generated by the inverter by varying the rate of switching commands to the inverter, the increased heat of the inverter being transferred by the second working fluid to the second heat exchanger to heat the first working fluid such that a refrigerant portion of the first working fluid boils.

2. The system of claim 1, wherein the controller is configured to vary the number of switching commands per unit time by changing the switching frequency of a PWM signal.

3. The system of claim 1, wherein the controller is configured to vary the number of switching commands per unit time by changing between a continuous PWM signal and a discontinuous PWM signal.

4. The system of claim 1, wherein the second heat exchanger is configured to provide an oil rich portion of the first working fluid to an oil separator.

5. The system of claim 1, wherein wherein the sensed temperature of the system is received by the controller from a temperature sensor thermally coupled with the second heat exchanger.

6. The system of claim 5, wherein the controller is configured to vary the number of switching commands per unit time by changing the switching frequency of a PWM signal.

7. The system of claim 1, further comprising a reversing mechanism operable to reverse the flow direction of a refrigerant in the vapor-compression circuit.

8. The system of claim 1, further comprising a temperature sensor configured to sense an inverter temperature; and wherein the inverter operation module is further structured to reduce the number of switching commands per unit time in response to the inverter temperature being greater than a reference temperature.

9. The system of claim 1 wherein the second heat exchanger comprises one of an oil separator, and an oil purifier.

10. A method comprising:
    providing a system comprising a compressor, an expander, a first heat exchanger, and a second heat exchanger, fluidly coupled to form a vapor-compression circuit containing a first working fluid, an electric motor configured to drive the compressor, an inverter comprising a plurality of switches, the inverter configured to provide output voltage to the electric motor through operation of the switches, a waste heat recovery circuit including a conduit containing a second working fluid, the conduit being in thermal contact with the second heat exchanger, and a controller configured to determine whether increased heat of the inverter is desired in response to a sensed temperature of the system and a heat production criterion, and in response to determining that increased heat is desired, increase heat generated by the inverter by varying the rate of switching commands to the inverter, the increased heat of the inverter being transferred by the second working fluid to the second heat exchanger to heat the first working fluid such that a refrigerant portion of the first working fluid boils;
    operating the controller to determine whether increased heat of the inverter is desired in response to a sensed temperature of the system and a heat production criterion; and
    in response to determining that increased heat is desired, operating the controller to increase heat generated by the inverter by varying the rate of switching commands to the inverter; and
    transferring increased heat of the inverter via the second working fluid to the second heat exchanger effective to heat the first working fluid such that a refrigerant in a portion of the first working fluid boils.

11. The method of claim 10, wherein the act of operating the controller to vary the number of switching commands per unit time comprises operating the controller to change the switching frequency of a PWM signal.

12. The method of claim 10, wherein the second heat exchanger is configured to provide an oil rich portion of the first working fluid to an oil separator.

13. The method of claim 10, wherein the sensed temperature of the system is received by the controller from a temperature sensor thermally coupled with the second heat exchanger.

14. The method of claim 13 wherein the act of operating the controller to vary the number of switching commands per unit time comprises operating the controller to change the switching frequency of a PWM signal.

15. The method of claim 10 wherein the second heat exchanger comprises one of an oil separator, and an oil purifier.

\* \* \* \* \*